US008862081B2

(12) United States Patent
Sutton et al.

(10) Patent No.: US 8,862,081 B2
(45) Date of Patent: Oct. 14, 2014

(54) TRANSCEIVER WITH RECEIVE PATH PERFORMANCE DIVERSITY AND COMBINER WITH JAMMER DETECT FEEDBACK

(75) Inventors: Todd Sutton, Del Mar, CA (US); James Stump, Chula Vista, CA (US); Hardik Patel, San Diego, CA (US); Laddan Hashemian, La Jolla, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 523 days.

(21) Appl. No.: 12/405,662

(22) Filed: Mar. 17, 2009

(65) Prior Publication Data

US 2010/0040178 A1    Feb. 18, 2010

Related U.S. Application Data

(63) Continuation-in-part of application No. 11/625,248, filed on Jan. 19, 2007.

(51) Int. Cl.
*H04B 17/02*    (2006.01)
*H04B 7/08*    (2006.01)

(52) U.S. Cl.
CPC .................. *H04B 7/0845* (2013.01)
USPC ............ 455/138; 455/273; 455/135; 455/306

(58) Field of Classification Search
USPC .................. 455/272–355, 572, 132–141, 455/272–279.1
See application file for complete search history.

(56) References Cited

U.S. PATENT DOCUMENTS

| 4,734,701 | A  |   | 3/1988  | Grobert                  |
|-----------|----|---|---------|--------------------------|
| 5,668,839 | A  | * | 9/1997  | Bernasconi et al. ....... 375/347 |
| 5,715,525 | A  |   | 2/1998  | Tarusawa et al.          |
| 5,838,742 | A  | * | 11/1998 | Abu-Dayya ............... 375/347 |
| 5,844,951 | A  |   | 12/1998 | Proakis et al.           |
| 6,115,409 | A  | * | 9/2000  | Upadhyay et al. .......... 375/144 |
| 6,141,371 | A  |   | 10/2000 | Holmes et al.            |
| 6,603,427 | B2 |   | 8/2003  | Cai et al.               |
| 6,650,702 | B1 |   | 11/2003 | Steele                   |
| 6,658,263 | B1 |   | 12/2003 | Ke et al.                |
| 6,842,498 | B2 | * | 1/2005  | Heinzl et al. ............ 375/350 |
| 6,844,850 | B1 | * | 1/2005  | Lin ......................... 342/378 |
| 6,937,677 | B2 |   | 8/2005  | Strolle et al.           |

(Continued)

OTHER PUBLICATIONS

Cavell, Mertz & Davis, Inc. Consulting Engineers and Sirius Satellite Radio Engineering, Interference to the SDARS Service from WCS Transmitters, Technical White Paper, Mar. 28, 2006, p. 1-44, USA.

(Continued)

*Primary Examiner* — Edward Urban
*Assistant Examiner* — Rui Hu
(74) *Attorney, Agent, or Firm* — Volpe and Koenig, P.C.

(57) ABSTRACT

Methods and apparatus for implementing a wireless communication transceiver having receive path performance diversity. The transceiver implements a plurality of signal paths that can be configured as diversity receive paths. Each of the plurality of signal paths includes a distinct RF filter. Each RF filter can be configured to provide a distinct jammer rejection profile. Each receive path also includes a jammer detector, that can be a multiple level jammer detector. Each jammer detector operates to control a level of processing gain applied to the signals in its receive path. The multiple gain scaled receive signals can be combined in a coherent combiner before being routed for further processing.

30 Claims, 16 Drawing Sheets

(56) References Cited

U.S. PATENT DOCUMENTS

| | | | |
|---|---|---|---|
| 7,386,034 B2 * | 6/2008 | Korpet et al. | 375/148 |
| 7,398,067 B2 | 7/2008 | Wolf | |
| 7,573,398 B2 * | 8/2009 | Hoctor et al. | 340/870.12 |
| 7,813,710 B2 * | 10/2010 | Katsube et al. | 455/307 |
| 8,005,452 B2 * | 8/2011 | Maiuzzo | 455/306 |
| 8,107,906 B2 * | 1/2012 | Lum et al. | 455/137 |
| 2004/0146127 A1 * | 7/2004 | Kent et al. | 375/346 |
| 2005/0078739 A1 | 4/2005 | Korpet et al. | |
| 2005/0181752 A1 | 8/2005 | Sahota | |
| 2005/0227631 A1 | 10/2005 | Robinett | |
| 2006/0073802 A1 * | 4/2006 | Chari et al. | 455/276.1 |
| 2007/0002961 A1 * | 1/2007 | Hoctor et al. | 375/267 |
| 2007/0242784 A1 | 10/2007 | Sampson et al. | |

OTHER PUBLICATIONS

Compatibility of Services Using WiMAX Technology with Satellite Services in the 2.3-2.7 GHz and 3.3-3.8 GHz Bands, WiMAX Forum, Copyright 2007 WiMAX Forum White Paper, p. 1-49.

Cavell, Mertz & Davis, Inc. Consulting Engineers and Sirius Satellite Radio Engineering, "Interference to the SDARS Service from WCS Transmitters," Technical White Paper, pp. 1-44 (Mar. 28, 2006).

"Compatibility of Services using WiMAX Technology with Satellite Services in the 2.3-2.7 GHZ and 3.3-3.8 GHZ Bands," WiMAX Forum White Paper, pp. 1-49 (2007).

* cited by examiner

TRANSCEIVER WITH RECEIVE PATH PERFORMANCE DIVERSITY AND COMBINER WITH JAMMER DETECT FEEDBACK

CROSS-REFERENCES TO RELATED APPLICATION

This application is a continuation in part of U.S. application Ser. No. 11/625,248, filed Jan. 19, 2007, and entitled TRANSCEIVER WITH RECEIVE AND TRANSMIT PATH PERFORMANCE DIVERSITY, hereby incorporated by reference herein in its entirety

BACKGROUND

1. Field of the Disclosure

The disclosure concerns methods, apparatus, and systems for a wireless transceiver with receive and transmit path performance diversity and jammer detection for combiner operation.

2. Related Art

Wireless communication devices typically operate in many different signal environments. Some operating environments permit high quality communication links supporting high data rates at relatively low transmit powers, while other environments permit only marginal quality communication links using relatively low data rates and requiring relatively high transmit powers. In other embodiments, a wireless communication device may utilize a high transmit power in order to support high data rates, or may support a low data rate at a relatively low transmit power.

The operating environment experienced by a wireless communication device may be largely determined by natural phenomena, such as the proximity of participants in a communication link, terrain, obscurations, weather conditions, and the like. Operating environments may also be largely affected by man-made phenomena, such as interference sources, spurious emissions, unintentional jammers, and the like.

The spectral proximity of the operating frequency band of the wireless communication device to frequency bands having potentially large interference sources can be used in estimating the potential adverse effects attributable to the out of band interference sources. Unfortunately, the operating frequency band of the wireless communication device may not be contiguous, and may be interrupted by one or more bands having potentially large interference sources. A receive front end in a wireless communication device typically spans the entire operating band. Even if multiple receive front end portions are aggregated to support an entire operating band, typically at least one front end portion is responsive to signals from an out of band interference source in a band adjacent to the operating frequency band. A front end device that is responsive to out of band interference source may operate with degraded performance in the presence of the out of band interference source. For example, an amplifier may be driven to a nonlinear mode in the presence of a strong out of band interference source.

The ability of a wireless communication device to filter out or otherwise attenuate potential large interference sources depends upon the design margins available for the receiver. Front end filters used to reject out of band interference sources typically introduce attenuation in the desired pass band. Typically, cascading multiple filters to provide rejection of all potential out of band interference sources results in the introduction of a substantial amount of attenuation into the receive front end. Increasing the amount of attenuation in a receive front end is typically not desirable, as it increases the noise figure of the receiver and reduces the corresponding receiver sensitivity.

However, providing substantially no filtering of out of band interference sources exposes the receiver in the wireless communication device to the out of band interference sources. An out of band interference source having substantially larger transmit power than a desired signal can operate, in essence, as a jammer.

An out of band jammer signal can cause a gain control loop within the receiver to reduce the gain applied to receive signals, which can desensitize the receiver to desired signals. Furthermore, an out of band jammer signal can result in the receive front end being driven to a nonlinear state. The large jammer signal can effectively capture the receiver making it virtually useless for receiving the desired signal. The receive front end can generate substantial distortion products, including potentially in band intermodulation distortion products when operated in the nonlinear state. The in-band distortion products cannot be removed using conventional filtering.

A transmitter portion of the wireless communication device operates under similar but complementary constraints. The out of band emissions from the transmitter portion may be constrained over the entire operating range of the transmitter.

The design of the wireless communication device may be further complicated in wireless communication devices that time division duplex transmit and receive portions over a shared RF path. In such a device, the filtering implemented to satisfy the out of band transmit emissions constraints may adversely affect the sensitivity of the receiver portion. Similarly, filtering introduced to alleviate effects of out of band interference sources on the receiver portion may introduce additional attenuation into the transmit path resulting in a substantial loss of transmit power.

Therefore, it is desirable to control the effects of out of band interference sources on a receiver while maintaining the out of band emissions constraints on a transmitter.

BRIEF SUMMARY

Methods and apparatus for implementing a wireless communication transceiver having receive path performance diversity. The transceiver implements a plurality of signal paths that can be configured as diversity receive paths. Each of the plurality of signal paths includes a distinct RF filter. Each RF filter can be configured to provide a distinct jammer rejection profile. Each receive path also includes a jammer detector, that can be a multiple level jammer detector. Each jammer detector operates to control a level of processing gain applied to the signals in its receive path. The multiple gain scaled receive signals can be combined in a coherent combiner before being routed for further processing.

Aspects of the disclosure include a method of receive path performance diversity. The method includes receiving signals at each of a plurality of distinct receive paths, processing the signals with a distinct jammer rejection profile in each of the plurality of distinct receive paths, detecting a presence of a jammer signal in each of the plurality of distinct receive paths, weighting signals in each of the plurality of distinct receive paths based in part on the presence of the jammer signal, and combining the weighted signals from the plurality of distinct receive paths.

Aspects of the disclosure include a method of receive path performance diversity. The method includes receiving a first RF signal in a first signal path, filtering the first RF signal in the first signal path with a first jammer rejection profile to generate a first filtered RF signal, receiving a second RF signal in a second receive path, detecting a jammer presence in the first signal path based on the first filtered RF signal, detecting a jammer presence in the second signal path based on the second RF signal, adjusting a first weight applied to signals in the first receive path based on the jammer presence in the first signal path, adjusting a second weight applied to signals in the second receive path based on the jammer presence in the second signal path, and combining a weighted first path signal with a weighted second path signal.

Aspects of the disclosure include an apparatus having receive path performance diversity. The apparatus includes a first receive path of a diversity receiver having a first jammer rejection profile, a second receive path of the diversity receiver having substantially devoid of RF jammer rejection, a first jammer detector configured to determine a jammer presence in the first receive path based on an RF signal from the first receive path following the jammer rejection profile, a second jammer detector configured to determine a jammer presence in the second receive path based on an RF signal from the second receive path, a gain scaler configured to adjust a gain in each of the first receive path and the second receive path based on the respective jammer presence, and a combiner configured to combine gain scaled signals from each of the first receive path and the second receive path.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE DISCLOSURE

Figure 1:
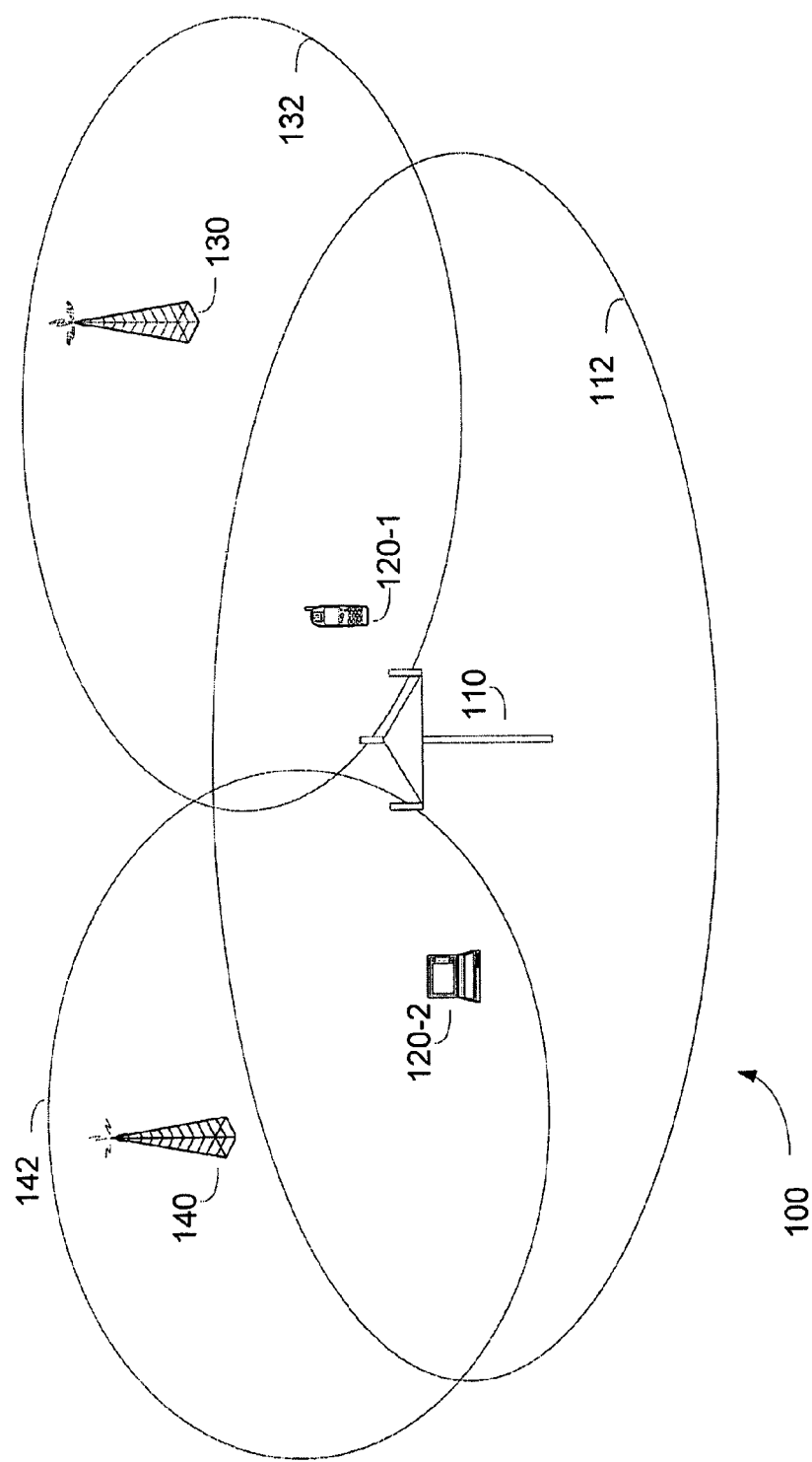
FIG. 1 is a simplified functional block diagram of an embodiment of a wireless communication system operating in the presence of potential jammers.

A wireless communication transceiver can simultaneously control the effects of out of band interference sources while maintaining satisfactory out of band transmit emissions constraints using multiple parallel receive paths implementing receive path performance diversity. The transmit signals can be Time Division Duplexed (TDD) across a selected one or more of the parallel receive paths, depending on the operating parameters associated with the transmit signal. Alternatively, the transmit signals can be Frequency Division Duplexed (FDD) using one or more distinct transmit signal paths, or some combination thereof, such as with Hybrid FDD. In general, the various embodiments described herein are not limited to any particular duplex implementation, except where such limitation is specifically stated.

The transceiver can implement receive path performance diversity using a plurality of substantially parallel receive paths. The plurality of substantially parallel receive paths can operate to concurrently receive signals, and the output from the plurality of substantially parallel receive paths can be coherently combined.

Each of the substantially parallel receive paths introduces a distinct frequency profile, and in particular, a distinct jammer rejection profile. In one embodiment, one receive path may include substantially no rejection of jammer signals, while other receive paths may include a jammer rejection profile that substantially rejects or otherwise filters at least one predetermined jammer signal or jammer frequency band. The insertion loss associated with the filters implementing the jammer rejection profiles desensitizes the associated filtered receive path relative to the receive path having substantially no rejection of jammer signals.

The receive path having substantially no rejection of jammer signals exhibits the best receive signal sensitivity, due in part to a lack of insertion loss associated with a filter implementing a jammer rejection profile. However, the unfiltered path likely performs poorly in the presence of strong jamming signals.

In another embodiment, each of the receive paths includes a distinct jammer rejection profile that substantially rejects or otherwise filters at least one predetermined jammer signal or jammer frequency band. Each receive path can provide a jammer rejection profile that rejects less than all of predetermined jammer signals, and no two receive paths share the same jammer rejection profile.

In one embodiment, each receive path can perform with substantially the same sensitivity under insignificant jammer conditions. The insertion loss associated with achieving filtering of a set of predetermined jammer signals is essentially distributed across the plurality of substantially parallel receive paths. Each path is slightly desensitized due to the insertion loss associated with its jammer filter, but at least one receive path provides improved signal quality under active jammer conditions, provided the corresponding jammer rejection profile rejects the active jammer signal.

The wireless transceiver can capitalize on the distributed jammer profiles and the associated decrease in overall insertion loss, particularly where the transmitter and receiver share at least the jammer filter circuitry. A transmitter can selectively route a transmit signal to one or more parallel transmit signal paths, where each transmit signal path passes through a jammer filter used by a receive path.

The wireless transceiver can selectively route or activate a particular transmit path based on one or more transmit operating parameters. The transmit operating parameters can include, for example, a transmit frequency, a proximity of the transmit frequency to a constrained emissions band, an insertion loss of a particular jammer filter, a desired transmit power, and the like, or some combination thereof.

FIG. 1 is a simplified functional block diagram of an embodiment of a wireless communication system 100 operating in the presence of potential jammer sources 130, 140. The wireless communication system 100 is illustrated as including a base station 110 supporting a corresponding coverage area 112. The coverage area 112 is depicted as substantially uniform, but such a coverage area is not a limitation. The base station 110 can support the coverage area 112 using one or more antennas configured to provide substantially omnidirectional coverage. Alternatively, the base station 110 can use one or more antennas, where each antenna or subset of antennas is configured to support a portion of the entire coverage area 112, such as a sector. The base station 110 can operate, for example, as an access point, gateway, portal, and the like to a network (not shown).

Although only a single base station 110 is shown in FIG. 1, the wireless communication system 100 can include a plurality of base stations 110, and each base station 110 may be configured similarly. The aggregate of the coverage areas corresponding to the plurality of base stations defines the coverage area of the system 100.

One or more subscriber stations 120-1 and 120-2 can be positioned within the coverage area 112. The base station 110 can manage one or more communication links with the subscriber stations 120-1 and 120-2. A subscriber station 120-1 or 120-2 can be a fixed station or can be a portable or otherwise mobile station that is capable of relocation.

The wireless communication system 100 can be configured to operate in an operating band that can include one or more band portions. The band portions can be contiguous or can be disjoint. The operating band can include shared transmit and receive operating bands or can include distinct transmit and receive operating bands.

Regardless of the operating band configuration, there can be one or more predetermined frequencies or frequency bands in which a potential interference source may originate. An interference source that has the capability to broadcast at transmit powers that are substantially greater than a power of a desired signal can be referred to as a jammer. In general, a jammer can be any interference source, and a jammer can intentionally or unintentionally operate to jam or otherwise substantially degrade communications within the operating band. For example, a jammer may be a signal transmitted in a neighboring frequency band.

Typically, a jammer is a predetermined interference source operating at a predetermined jammer frequency or frequency band that can unintentionally degrade communications at one or more subscriber stations 120-1 and 120-2. The jammer frequency bands may be predetermined and may lie near or even inside the band edge of one or more of the band portions.

FIG. 1 illustrates two potential jammer sources 130 and 140, each having a corresponding jammer range 132 and 142, respectively. Although the potential jammer sources 130 and 140 are described in the context of unintentional interference sources, each jammer source, e.g. 130, may be a communication terminal, broadcast source, beacon, and the like that generates a signal that may be used by one or more subscriber stations 120-1 or 120-2. For example, a first jammer source 130 can be a base station for an alternative communication system, which may be supported by a multi-mode subscriber station. Alternatively, the first jammer source 130 can be a broadcast transmitter for a communication service that can be received by a multi-mode subscriber station. The jammer source 130 or 140 is not limited to a signal source that is never intended for a subscriber station 120-1 or 120-2, but instead, refers to an interference signal source that potentially interferes with communications in the wireless communication system 100. As an example, a jammer source can be a cellphone, laptop computer or other mobile wireless device. In some instances the jammer source can even be located within the same device as the affected receiver. The affected receiver and the jammer source do not necessarily share an antenna, but may experience coupling between these two systems. For example a device may concurrently execute WiMax and WiFi communications. In the United States, WiFi utilizes the Instrumentation Scientific Medical band from about 2400 to 2483.5 MHz and a WiMax device may use a band of about 2496 to 2690 MHz. When a WiFi device is transmitting, the WiMax receiver can be jammed and visa-versa. Another example of coexistence of a jammer source and affected receiver within a single device is a WiMax device that also uses BlueTooth communications in the ISM band.

A first jammer source 130 can transmit a jamming signal across a first affected area 132 that can at least partially overlap a coverage area 112 of the wireless communication system 100. The first affected area may not correspond to a service area associated with a communication system using the first jammer 132. Instead, the first affected area 132 refers to the area over which transmissions from the first jammer source 130 interfere with communications in the wireless communication system 100. The first jammer source 130 operates at a predetermined frequency or within a predetermined frequency band.

Similarly, a second jammer source 140 can transmit a jamming signal across a second affected area that can at least partially overlap a coverage area 112 of the wireless communication system 100. The second jammer source 140 operates at a predetermined frequency or within a predetermined frequency band that can overlap or be distinct from that of the first jammer source 130. The affected areas 132 and 142 can overlap or may be distinct.

A first subscriber station 120-1 can be within the coverage area 112 of the base station 110 and can establish a communication link with the base station 110. The first subscriber station 120-1 can also be in the first affected area 132 corresponding to the first jammer source 130. The first subscriber station 120-1 can implement a receiver with path performance diversity in order to enable operation in the presence of a jammer signal from the first jammer source 130, while maintaining receiver sensitivity when operating in the absence of any jammer. For example, because the jammer frequency or frequency band is predetermined, one receive path in the first subscriber station 120-1 can be built to reject or, in other words, "notch out" the jammer signal from the first jammer source 130.

Similarly, a second subscriber station 120-2 can be within the coverage area 112 of the base station 110 and can establish a communication link with the base station 110 and can also be in the second affected area 142 corresponding to the second jammer source 140. The second subscriber station 120-2 can similarly implement a receiver with path performance diversity in order to enable operation in the presence of a jammer signal from the second jammer source 140, while maintaining receiver sensitivity when operating in the absence of any jammer.

The path diversity receiver in each of the first and second subscriber stations, 120-1 and 120-2, can include a receive path that has a filter to substantially reject both the first and second jammer source 130 and 140 signals, or can include distinct receive paths, where a first receive path includes a filter that substantially rejects the signal from the first jammer source 130 and a second receive path that substantially rejects the signal from the second jammer source 140. If the affected areas 132 and 142 overlap, as shown in FIG. 1, it may be preferable to include a receive path that rejects both jammer signals. Alternatively, if it is unlikely that a subscriber station, 120-1 or 120-2, would concurrently experience multiple jammer signals, it may be preferable to implement distinct receiver paths, each having a filter to reject a single jammer signal.

Figure 2:
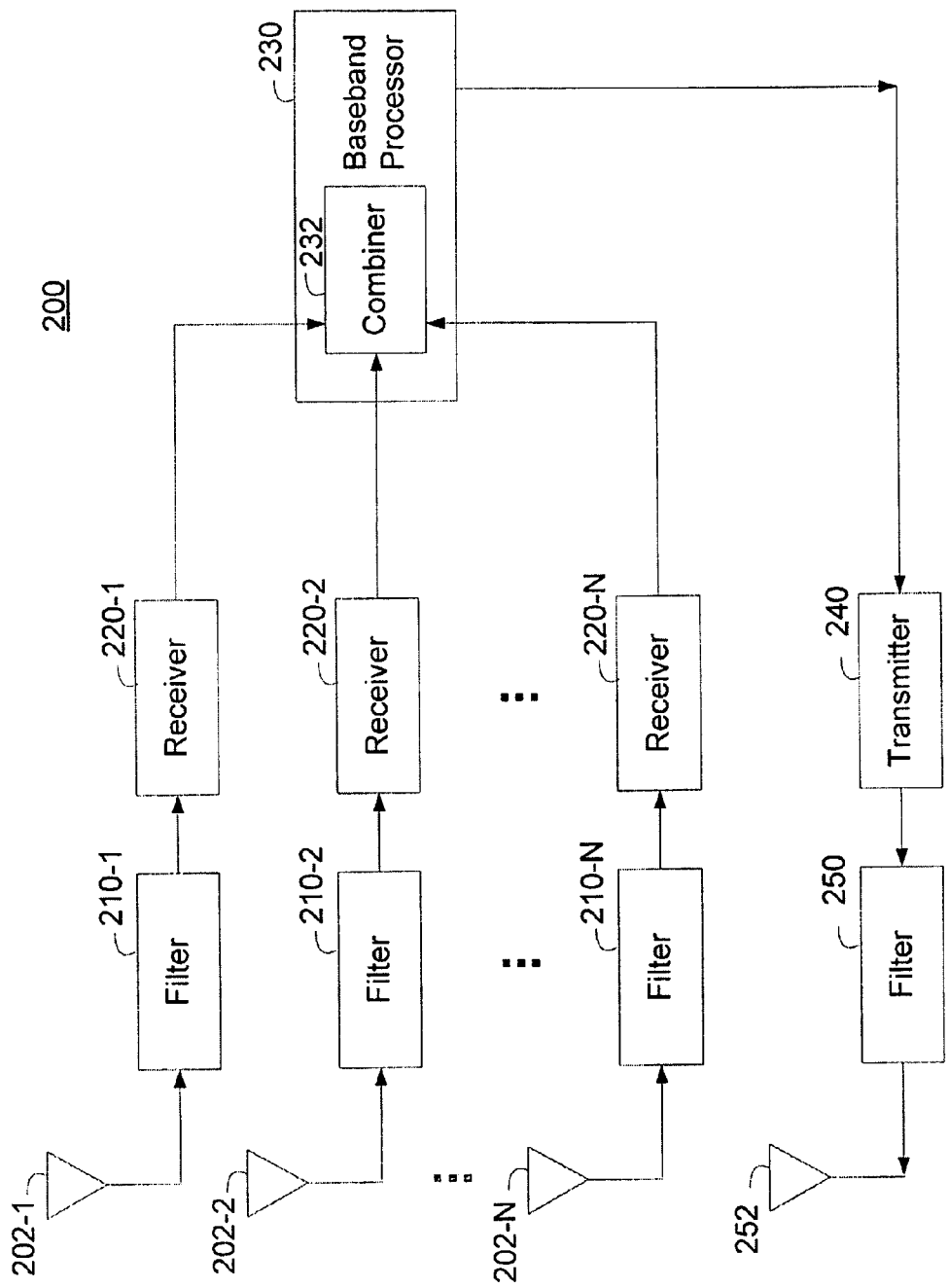
FIG. 2 is a simplified functional block diagram of an embodiment of a transceiver with receive path performance diversity.

FIG. 2 is a simplified functional block diagram of an embodiment of a transceiver 200 with receive path performance diversity. The transceiver 200 can be implemented, for example, within a subscriber station of FIG. 1. Although the transceiver 200 could also be integrated within the base station of FIG. 1, the mobile nature of a subscriber station typically makes its receive environment more dynamic, and subject to a wide range of environments.

The transceiver 200 includes a plurality of receive paths, with each receive path implementing a distinct jammer rejection profile. The transceiver 200 also includes a transmit path to enable communications from the transceiver 200 to a destination device, such as a base station. Although FIG. 2 depicts the transmit path as distinct from any receive paths, in other embodiments the transmit path may share a portion of one or more receive paths.

The transceiver 200 can implement receive path performance diversity alone or can implement receive path diversity in combination with other diversity techniques. For example, the structure of the parallel receive paths permits relatively straight forward implementation into a transceiver implementing space diversity, space time diversity, frequency diversity, and the like or some combination thereof.

A first receive path includes a first antenna 202-1 coupled to a first filter 210-1 configured to provide a first jammer rejection profile. The first jammer rejection profile can operate to reject or otherwise attenuate one or more predetermined jammer frequencies or jammer frequency bands. The output from the first filter 210-1 is coupled to a first receiver 220-1. The first receiver 220-1 can be configured, for example, to amplify, further filter, frequency convert, and convert to digital the received signal.

The output from the first receiver 220-1 is typically a digitized baseband signal but is not limited to such a signal. The output of the first receiver 220-1 is coupled to an input of a baseband processor 230.

A second receive path operates similar to the first receive path. A second antenna 202-2 couples a receive signal to a second filter 210-2 that is configured to provide a second jammer rejection profile. The output from the second filter 210-2 is coupled to a second receiver 220-2. The output from the second receiver 220-2 is coupled to a second input of the baseband processor 230.

The transceiver 200 implements additional substantially parallel receive paths, up to an Nth receive path. FIG. 2 depicts the number of independent receive paths, N, as greater than two. However, the number of independent receive paths, N, can be any positive integer greater than one.

The Nth receive path is configured similar to all other receive paths. An Nth antenna 202-N couples a receive signal to an Nth filter 210-N that is configured to provide an Nth jammer rejection profile. The output from the Nth filter 210-N is coupled to an Nth receiver 220-N. The output from the Nth receiver 220-N is coupled to an Nth input of the baseband processor 230.

Each filter 210 is configured with a distinct jammer rejection profile. In one embodiment, each filter is configured to reject a distinct one or combination of the predetermined jammer frequencies or jammer frequency bands.

In another embodiment, one of the filters 210 is configured to have substantially no rejection of predetermined jammer frequencies. In such an embodiment, each of the remaining filters 210 could be configured to reject at least one of the predetermined jammers.

A filter can be configured to reject a predetermined jammer frequency or band of jammer frequencies using a band reject or notch configuration. A band reject filter can operate to reject jammers within a band of frequencies, while a notch filter can be configured to reject a jammer signal at or near a very narrow frequency range.

In one embodiment, the notch filter can be implemented, for example, as a low-Q deep notch at a predicted jammer frequency. The notch can be implemented as a low-Q notch in order to allow for frequency offsets that may be attributable to manufacturing tolerances, Doppler, temperature drift, and the like, or some combination thereof. Alternatively, the notch filter may be implemented as a high-Q deep notch at a predicted jammer frequency. Any band reject or notch filter inserted into a receive signal path typically introduces an insertion loss penalty. A notch may be designed to have a width and depth that is just sufficient to attenuate the intended jammer signal in order to minimize the associated insertion loss in the frequency band of interest.

Inevitably, however, the jammer rejection filter causes some insertion loss in the frequency band of interest. In particular, deep notch filters introduce a frequency dependent insertion loss in the band of interest, typically causing more insertion loss as the passband frequency approaches the frequency of the notch. Due to this insertion loss, a receive path incorporating a jammer rejection filter is desensitized in the band of interest and, thus, has a degraded performance when the signal level is very low, regardless of whether a jammer is present.

One advantage of receive path performance diversity is that the paths can cover for one another under extreme operating conditions. For example, at a first frequency of interest at which a first path has degraded sensitivity due to insertion loss in the passband caused by a notch filter at a first jammer frequency, a second path which does not incorporate the same notch filter will have better sensitivity. Thus, under low signal level conditions in the absence of jammers, the second path provides better performance at the first frequency of interest than the first path.

However, under more moderate signal level conditions and in the presence of jammers at the first jammer frequency, the first path provides better performance than the second path. The second receive path performs poorly under these conditions because the jammer power can capture the second receive path. When captured, the second receive path components may operate in a nonlinear mode, which may introduce in-band and out-of-band spurs as well as signal distortion. In addition, the jammer energy can also capture the automatic gain control mechanism so that the power level of the desired signal at the input to the baseband processor is small in comparison to ideal signal levels. In contrast, the notch filter in the first path rejects the jammer power and the first receiver path continues to operate effectively.

Providing a signal path having substantially no jammer rejection can be advantageous because such a path typically has the best noise figure and, thus, increased sensitivity. However, such a path is also the most likely path to become captured in the presence of jammers.

When signals output by the multiple performance diverse receive paths are combined according to one of several techniques, the combined signal may rely more heavily on the path which is performing well under the current operating conditions. For example, using maximum ratio combining, the signals are weighted before combining. Strong and undistorted signals are weighed more heavily than low power, noisy or distorted signals. Thus, a maximum ratio combiner will weigh the first path signal more heavily when the second path has been captured by a jammer and is thus producing a noisy and distorted signal. The maximum ratio combiner will weigh the second path signal more heavily under low signal level conditions and in the absence of jammers because the better noise figure of the second path produces a less noisy signal than the first path.

The receivers 220 can be similarly configured or can be configured to support a particular diversity implementation. For example, where the transceiver 200 supports time diversity, each receiver 220 can be configured to receive a distinct time of arrival. Where the transceiver 200 supports frequency diversity, each receiver 220 can be configured to tune to a distinct receive frequency. The receivers 220 may be configured in other ways to support other diversity techniques.

The baseband processor 230 operates to coherently combine the outputs from the independent receive paths. The result of the coherent combination should be an improved signal quality. The coherent combination is illustrated functionally as a combiner 232. The combiner 232 can be configured to simply sum all of the receiver outputs. In other embodiments, the combiner 232 can be configured to time align the signals prior to combination or can be configured to further process one or more of the signals prior to combination.

The combiner 232 can operate directly on the signals output from the receivers 220, or the signals from the receivers 220 can be further processed prior to combining. Additional signal processing can be performed, for example, by the baseband processor 230, the combiner 232, or some combination thereof.

In one embodiment, the baseband processor 230 is configured to further process the signals from the receivers 220 prior to combining. The baseband processor 230 can be configured, for example, to equalize, demodulate, correlate, or otherwise process the signals prior to combining.

In one embodiment, the transceiver 200 is configured to receive OFDM signals when in the receive mode. Each of the receivers 220 can be configured to generate a corresponding baseband signal and couple the baseband signal to the baseband processor 230. The baseband processor 230 can be configured to transform the baseband OFDM symbols to the subcarriers using, for example, a transform module that can include a Fast Fourier Transform (FFT) engine (not shown). The baseband processor 230 can also be configured to generate a channel estimate for each received signal. The combiner 232 can operate on the transformed signals in conjunction with the associated channel estimates to maximize the combined signal quality. For example, the combiner 232 my operate as a Minimum Mean Square Error (MMSE) combiner or may operate as part of an MMSE decoder.

The baseband processor 230 can be configured to further process the received signals, or can be configured to route the signals to another module (not shown) for further processing.

For example, the baseband processor 230 can be configured to synchronize, demodulate, extract, or otherwise process the received signals.

The baseband processor 230 can be configured to utilize the received signals or can be configured to route the received signals to associated destination devices or ports (not shown). Similarly, the baseband processor 230 can operate to receive baseband signals and process them for transmission on an uplink channel to the base station.

The baseband processor 230 processes the uplink signals and couples them to a transmitter 240. The transmitter 240 filters, amplifies, and frequency converts the baseband signal to a transmit operating frequency. The transmitter 240 couples the transmit signal to a transmit filter 250 for RF filtering. The transmit filter 250 can be configured to provide the transmit mask filter that operates to reduce or otherwise attenuate any transmit signal components that lie within a reduced or otherwise constrained emissions band. The filtered transmit signal is coupled to a transmit antenna 252 for transmission to the base station or some other destination device.

The transceiver 200 depicted FIG. 2 utilizes distinct filters and antennas for the receive and transmit paths. However, other embodiments may share portions of the RF signal paths between the receiver and the transmitter. Sharing a portion of the RF path may be typical in transceivers implementing shared operating bands, such as a transceiver that time division duplexes (TDD) the transmit and receive signals over the same operating band.

Figure 3A:
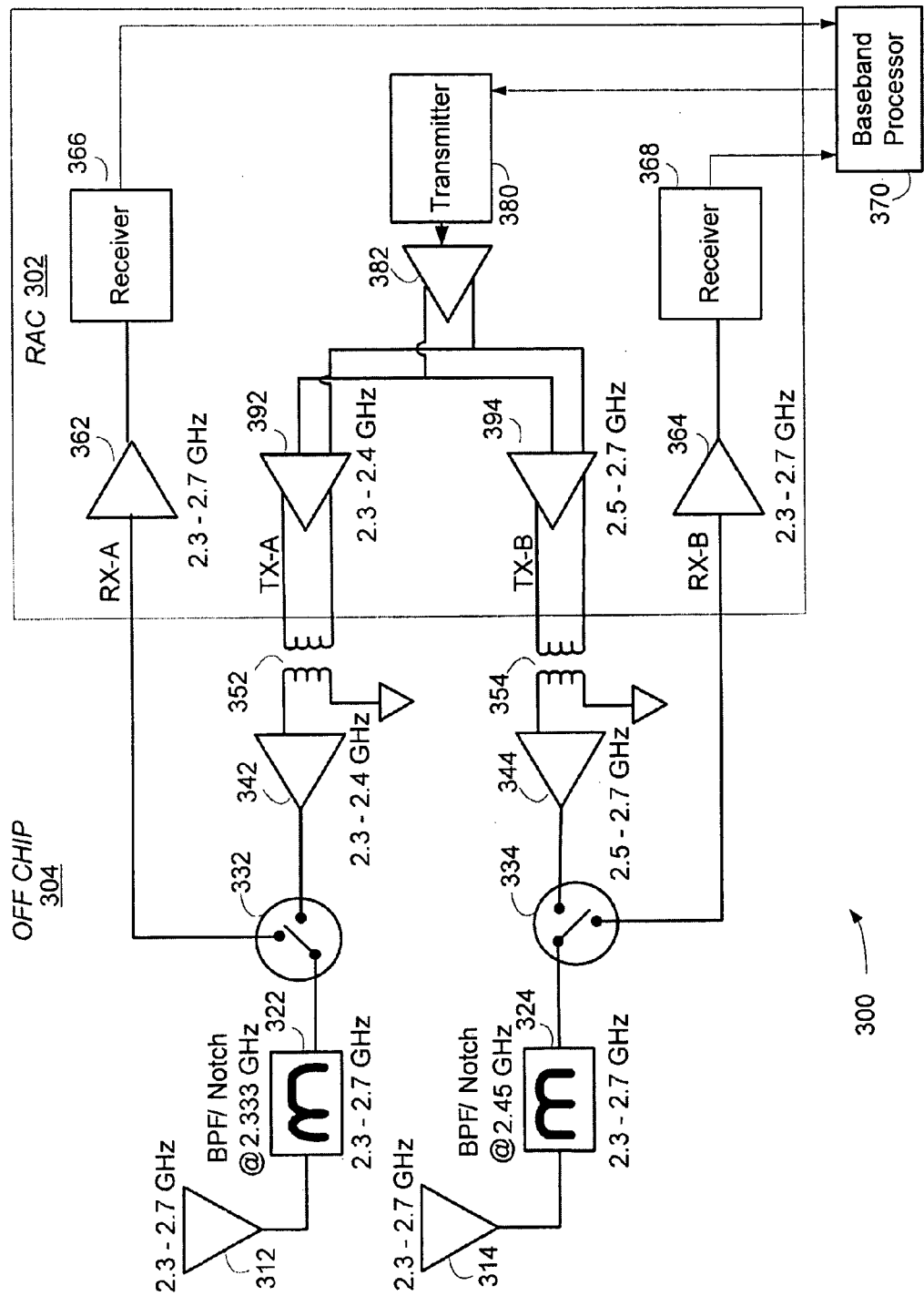
FIGS. 3A-3C are simplified functional block diagrams of embodiments of a transceiver with receive path performance diversity.

FIG. 3A is a simplified functional block diagram of an embodiment of a transceiver 300 with receive path performance diversity. The transceiver 300 can be a TDD transceiver implemented within a subscriber station of FIG. 1. The particular transceiver 300 illustrated in FIG. 3A is configured to support IEEE 802.16 Orthogonal Frequency Division Multiple Access (OFDMA) communications, typically referred to as WiMax communications. However, the techniques and methods described herein are not limited to application in the described system.

The transceiver 300 implementing the receive path diversity depicted in FIG. 3A ensures that at least one receive path remains linear even in the presence of one jamming signal in one of the predetermined jammer bands. Similarly, selectively routing the transmit signal based on an operating parameter reduces or substantially eliminates out of band emissions.

The transceiver 300 receives concurrently in a plurality of substantially parallel receive paths, and can combine the received signals to improve the quality of the received signals. For example, the diversity receiver can implement maximum ratio combining, Minimum Mean Square Error combining, best path selection, equal gain combining, switch diversity combing, antenna selection and the like, or some other type of signal combining. The diversity receiver can implement receive path signal combining of RF signals, baseband signals, demodulated signals, or some other processed signal. For example, the diversity receiver operating on received Orthogonal Frequency Division Multiplex (OFDM) symbols can be configured to combine the receive signals from the distinct receive signal paths after frequency domain transformation of baseband signals and after channel estimation and compensation.

The transceiver 300 is configured as a RF analog integrated circuit (RAC) 302 in combination with an off-chip RF front end portion 304. The RF front end portion 304 includes signal processing paths that are shared between the transmit and receive portions of the transceiver 300.

The transceiver 300 is configured to support an operating frequency band of approximately 2.3-2.7 GHz that is operated in TDD fashion for transmit and receive operations. The operating frequency band is not contiguous, but instead, includes at least two distinct bands that can be the source of interfering signals.

A first interference or jamming band is centered at approximately 2.333 GHz and spans approximately 2.320-2.345 GHz. This interference band is used to support ground station repeaters for Digital Audio Radio (DAR). A DAR repeater can transmit at up to approximately 2 kW EIRP and thus can present a substantial jammer source to a transceiver 300 supporting the 2.3-2.7 GHz band.

In the same way that the DAR repeater causes potential interference to the transceiver 300, the transceiver 300 can cause unintended interfere to a DARs subscriber station receiver or terrestrial repeater station. Thus, the transceiver 300 must limit the power which it emits in the DAR band. Emissions in the DAR band are created by noise, spurs, inter modulation products, phase noise, baseband noise, quantization noise and the like which are produced unintentionally by the transceiver 300. The filter 322 can serve to reduce emissions in the DARs band.

A second interference or jamming band is centered at approximately 2.45 GHz and spans approximately 2.400-2.4835 GHz. The second interference or jamming band can be used to support unlicensed communication systems, such as IEEE 802.11 b/g communications or communications in accordance with the BLUETOOTH communications standard. Alternatively, the second interference band can support industrial, scientific and medical (ISM) purposes, such as for microwave ovens.

In the same manner unintentional emission are created in the DAR band, the transceiver 300 can cause unintended interference in the 2.400-2.488 GHz band. The government sets a limit on emissions in the second jammer band. The filter 344 can serve to reduce emissions in the band 2.400-2.488 GHz. The interference issue in this band is particularly vicious when a base station for the band of interest is co-located with a base station operating in the jammer band.

As with the DAR band and the 2.400-2.488 GHz band, in many cases, a jammer band is also a restricted emissions band. Thus, the subscriber station must carefully limit its transmit emissions in the same general frequency band in which it expects to see jammers. Thus, in one embodiment, the same notch filters that are used to provide jammer rejection and receive path performance diversity are used to restrict out-of-band emissions and provide transmit path performance diversity as well.

The RF front end portion 304 includes those portions of the transceiver 300 that are not typically implemented on an IC or that are not typically integrated with other transceiver functions. Of course, the receive path performance diversity is not limited to any particular division of on-chip and off-chip processes.

The RF front end portion 304 includes a first antenna 312 configured to receive signals during at least a receive portion of TDD operation. The first antenna 312 is coupled to a first filter 322 configured to provide a first jammer rejection profile. The first filter 322 can be configured, for example, to position a notch centered at approximately 2.333 GHz to attenuate potential jammer signals in the corresponding band. The first filter 322 can also be configured to provide general RF bandpass filtering of the operating band.

The first filter 322 is coupled to a first switch 332 that can be configured as a transmit/receive (T/R) switch. The first switch 332 is configured to selectively switch the first antenna 312 and first filter 322 to one of a transmit or receive signal path.

The first switch 332 couples the first filter 322 to a first receive amplifier 362 when controlled to the receive state. The first switch 332 couples the first filter 322 to an output of a first power amplifier (PA) 342 when controlled to the transmit state.

The first receive amplifier 362 amplifies the receive signal and couples the amplified signal to a first receiver 366 for additional processing. The first receive amplifier 362 has a frequency response that supports the entire operating frequency. The first receiver 366 couples the processed signal, which may be a baseband signal, to a baseband processor 370 for further processing and combining with the signal from the second receive path. The baseband processing 370 can be configured to perform virtually any type of signal combination and can be configured, for example, to perform maximum ratio combining.

A second RF path is configured similarly to the first RF signal path. A second antenna 314 is coupled to a second filter 324. The second filter 324 is configured to provide a second jammer rejection profile that is distinct from the jammer rejection profile provided by the first filter 322. For example, the second filter 324 is configured with a notch centered at approximately 2.45 GHz to substantially attenuate signals in the associated unlicensed or ISM band.

The second filter 324 is coupled to a second switch 334 that is configured as a T/R switch. When controlled to be in the receive position, the second switch 334 couples the second filter 324 to a second receive amplifier 364. The second receive amplifier 364 has a frequency response that supports the entire operating frequency. The output of the second receive amplifier 364 is coupled to a second receiver 368. The output of the second receiver 368 is coupled to the baseband processor 370 for combining with the signal from the first receive path. The second switch 334 couples the second filter 324 to an output of a second power amplifier 344 when controlled to the transmit state.

In transmit mode, the baseband processor 370 generates baseband transmit signals and couples the baseband signals to a transmitter 380 for processing to a RF transmit signal. The transmitter 380 couples the transmit signal to a transmit amplifier 382 that amplifies the transmit signal. The transmit amplifier 382 can be configured to substantially support the entire operating band.

The output of the transmit amplifier 382 is coupled to inputs of a first driver amplifier 392 and a second driver amplifier 394. The first driver amplifier 392 is configured to support a portion of the operating band. For example, the first driver amplifier 392 is configured to support the frequency band spanning approximately 2.3-2.4 GHz. Similarly, the second driver amplifier 394 is configured to support a portion of the operating band, and supports a portion of the operating band that is complementary to the portion supported by the first driver amplifier 392. For example, the second driver amplifier 394 can support the frequency band spanning approximately 2.5-2.7 GHz. The unsupported frequency band of 2.4-2.5 GHz corresponds approximately to the second jammer band.

The output of the first driver amplifier 392 is coupled to the input of the first PA 342 via a first transformer 352 that can be configured as a balun when converting a differential output from the first driver amplifier 392 to a single ended input of the first PA 342. The first PA 342 also supports a portion of the operating band, and supports the same portion of the operating band that the first driver amplifier 392 supports.

Similarly, the output of the second driver amplifier 394 is coupled to the input of the second PA 344 via a second transformer 354 that can be configured as a balun. The second PA 344 supports the portion of the operating band that the second driver amplifier 394 supports.

Although the driver amplifiers 392 and 394 are described as having differential outputs with the output signals coupled via respective baluns, 352 and 354, the transmit signals may be processed using single ended signals rather than differential signals. The baluns 352 and 354 may be omitted in a single ended configuration.

The transmit signal can be selectively routed to a transmit path based on the band of operation. Although the driver amplifiers 392 and 394 and PAs 342 and 344 are depicted as supporting only a portion of an operating band, the amplifiers can be configured to support the entire operating band, while maintaining the same criteria for selective routing of the transmit signal. The elements in the unselected transmit path can be de-energized or otherwise powered-down in order to reduce the total power consumption of the transceiver.

The transceiver 300 selectively routes the transmit signal to a transmit path based on one or more operating parameters of the transmit signal. In the embodiment of FIG. 3A, the operating parameter includes transmit frequency or transmit frequency band. The frequency response of the driver amplifiers 392 and 394 in conjunction with the frequency response of the PAs 342 and 344 provide additional filtering of the transmit signals and operate in conjunction with the filters 322 and 324 to reduce or substantially eliminate emissions in the restricted emissions band. The frequency response of the amplifiers can substantially reduce or eliminate transmit emissions in the furthest restricted emissions band, and the notch in the associated filter, 322 or 324, can operate to reduce or eliminate transmit emissions in the restricted emissions band near the supported portion of the operating band.

As noted above, the jammer rejection filter (which in this embodiment is also acting as a restricted emissions filter) causes some insertion loss in the frequency band of interest. In particular, the filters 322 and 324 introduce a frequency dependent insertion loss in the band of interest, typically causing more insertion loss as the passband frequency approaches the frequency of the notch. Due to this insertion loss, a transmit path incorporating a restricted emissions filter has a higher path loss from the output of the PA 342, 344 to the antenna 312, 314 and, thus, has either a resultant decrease in maximum output power or a higher power usage than would a path which did not incorporate such filtering.

Thus, the wireless transceiver 300 can selectively route or activate a particular transmit path based on one or more transmit operating parameters to meet the emission requirements in a restricted emissions band while optimizing power usage. The transmit operating parameters can include, for example, a transmit frequency, a proximity of the transmit frequency to a constrained emissions band, an insertion loss of a particular jammer filter, a desired transmit power, and the like, or some combination thereof. Thus, in the embodiment shown FIG. 3A, the transmitter 380 may select one of the transmit paths based upon the desired transmit power and the transmit frequency. As the transmit power increases, causing a corresponding increase in out-of-band emissions, and as the transmit frequency approaches the restricted emissions band, the transmitter 300 can activate a transmit path with more filtering and that, therefore, consumes more power. As the transmit power decreases and the transmit frequency moves away from the restricted emissions band, the transmitter 300 can activate a path with less filtering.

Figure 3B:
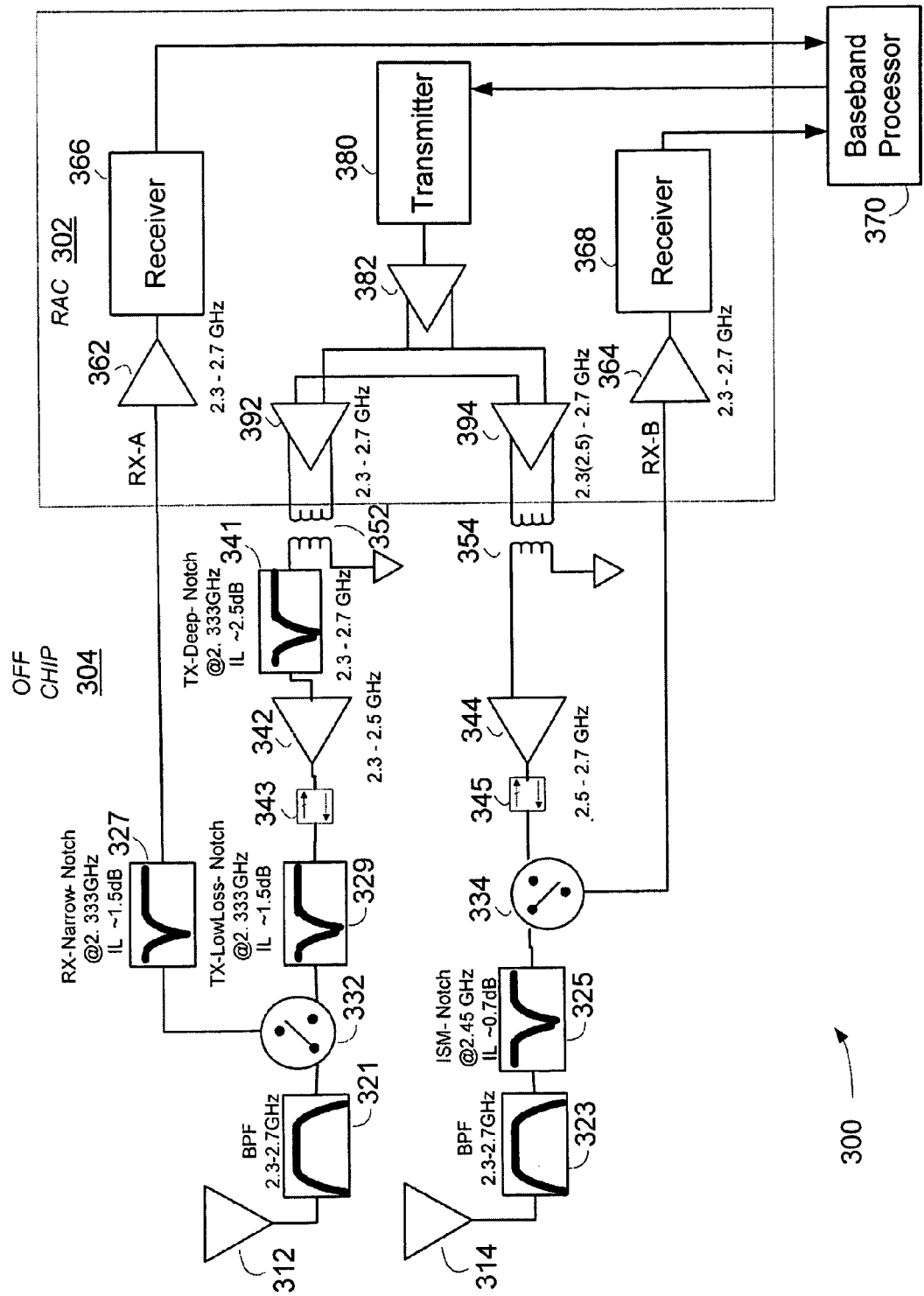

FIG. 3B is a simplified functional block diagram of another embodiment of a transceiver 300 with receive path performance diversity. The transceiver 300 of FIG. 3B is similar to the embodiment of FIG. 3A. The RF analog integrated circuit 302 and baseband processor 370 can be very similar if not virtually identical to those portions shown in FIG. 3A.

In the transceiver 300 of FIG. 3B, the filters are implemented as distinct bandpass and notch filters. The bandpass filters 321 and 323 provide filtering of the operating band and operate in combination with notch filters 325, 327, and 329. One bandpass filter 321 or 323 is positioned in each of the shared T/R signal paths.

The first switch 332 couples the first bandpass filter 321 to one of a first receive notch 327 or a low loss transmit notch 329. The output of the first receive notch 327 is coupled to a corresponding receive input of the RF analog integrated circuit 302.

The transmit path sharing the first antenna 312 divides the filtering into multiple parts and provides improved emission performance in the 2.333 GHz frequency band. A deep transmit notch 341 is coupled to the output of the first balun 352 and operates to provide significant filtering of phase noise, thermal noise, baseband noise, and quantization noise. However, the deep transmit notch 341 may have a relatively large insertion loss. The relatively high insertion loss associated with the deep transmit notch 341 may make it more desirable to position the deep transmit notch 341 in the transmit signal path prior to the first PA 342.

The output of the first PA 342 is coupled to a first circulator/isolator 343 that can operate to reduce the amount of received or reflected energy that is coupled to the output of the first PA 342. The output of the first PA 342 is coupled via the first circulator/isolator 343 to the input of the low loss transmit notch 329. The low loss transmit notch 329 provides additional filtering at an emissions band of interest, and provides filtering of PA thermal noise as well as reducing some spectral regrowth.

The transmit path sharing the second antenna 314 separates the filtering into a series combination of distinct bandpass filter 323 and notch filter 325. The output of the second PA 344 is coupled to the second switch 334 via a second circulator/isolator 345. Otherwise, the remainder of the second transmit and receive paths are identical to the signal paths illustrated in the transceiver of FIG. 3A.

Figure 3C:
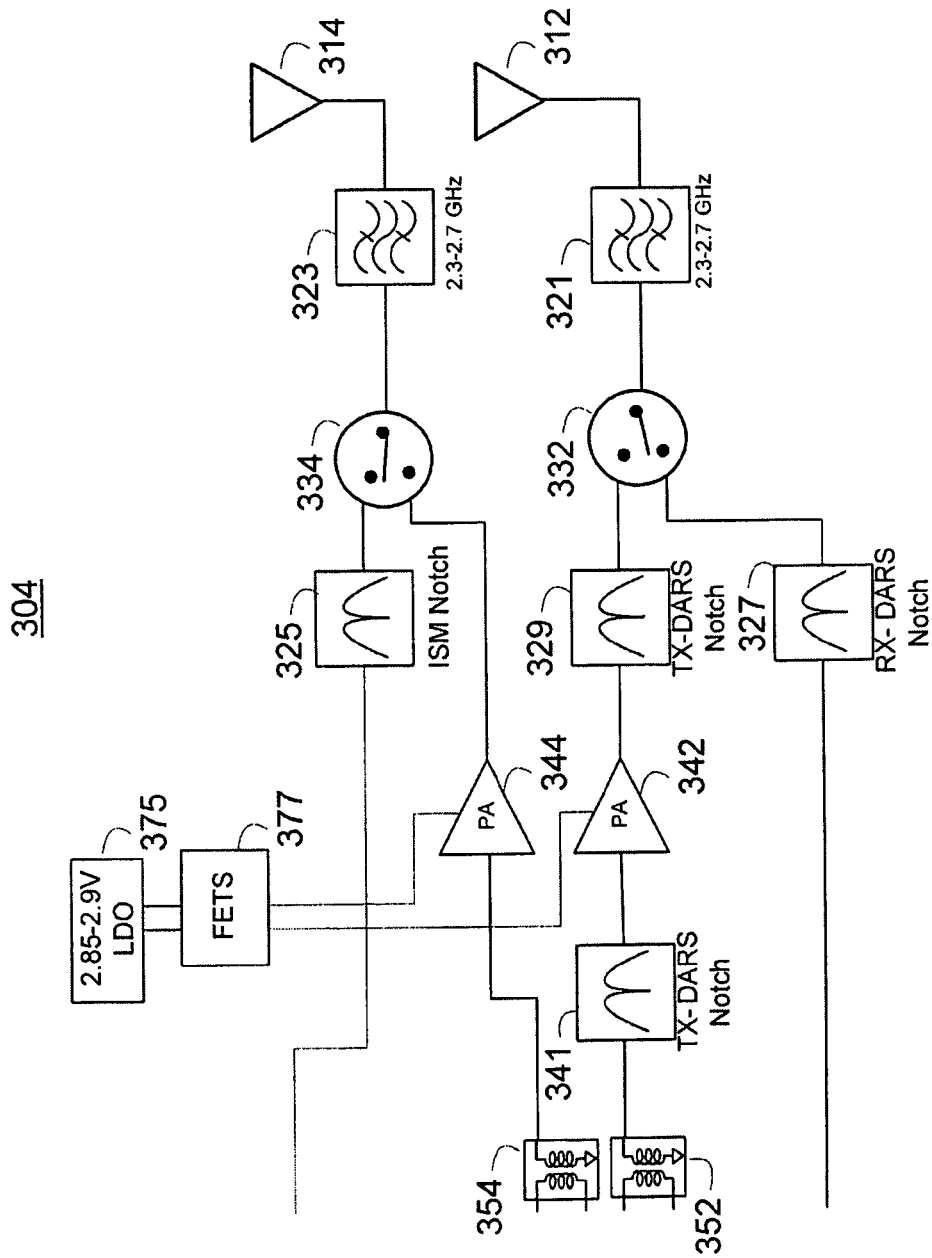

FIG. 3C is a simplified functional block diagram of an embodiment of a RF front end portion 304. The RF front end portion 304 can be implemented, for example, in the transceivers of FIG. 3A or FIG. 3B, replacing the RF front end portions shown in the respective figures.

In the embodiment of FIG. 3C, the shared transmit and receive signal paths of the RF front end portion 304 incorporate bandpass filters 321 and 323 having substantially no rejection of predetermined jammer frequencies. The jammer rejection/emission reduction is provided using distinct notch filters 325, 327, and 329.

The first switch 332 couples the first bandpass filter 321 to one of a transmit or receive path. The first switch 332 couples the first bandpass filter 321 to the first receive notch 327 when the first switch 332. is controlled to direct signals to a receive path.

A first balun 352 couple transmit signals to the deep transmit notch 341. The output of the deep transmit notch 341 is coupled to the first PA 342. A low loss transmit notch 329 couples the output of the first PA 342 to the first switch 332. The first switch 332 couples the filtered transmit signal to the first shared signal path when the first switch 332 is controlled to direct signals from the transmit path.

A second signal path includes a second antenna 314 that is coupled to a second bandpass filter 323. The second bandpass filter 323 is coupled to the second switch 334. The second switch can be controlled to couple the second bandpass filter to a second receive notch 325 when in the receive mode. The second switch 334 couples the second bandpass filter 323 to the second PA 344 when in the transmit mode.

The RF front end portion 304 also explicitly illustrates the selective energizing of the PAs 342 and 344. A power source 375, such as a linear regulator, low drop-out (LDO) regulator, switching power supply, and the like, can be used to energize the PAs 342 and 344. A controllable power switch 377, that can be implemented as a bank of FET switches or controllable Low Drop Out (LDO) regulator can be selectively controlled to energize one or more of the PAs 342 or 344. For example, the controllable power switch 377 can be controlled to energize one of the first PA 342 or the second PA 344 based, at least in part, on the operating frequency of the transmit signal. The controllable power switch 377 can be configured to selectively de-energize all PAs 342 and 344 when operating in the receive mode.

The embodiments illustrated in FIGS. 3A-3C are not exhaustive of transceiver configurations, nor of receive path performance diversity configurations. Instead, the embodiments are provided to illustrate the various different configurations that can be used in a TDD transceiver utilizing just two distinct T/R signal paths. The frequencies noted in FIGS. 3A-3C are illustrative and the principles described herein can be directly applied to other frequency bands of interest and other expected jammer bands.

Figure 4:
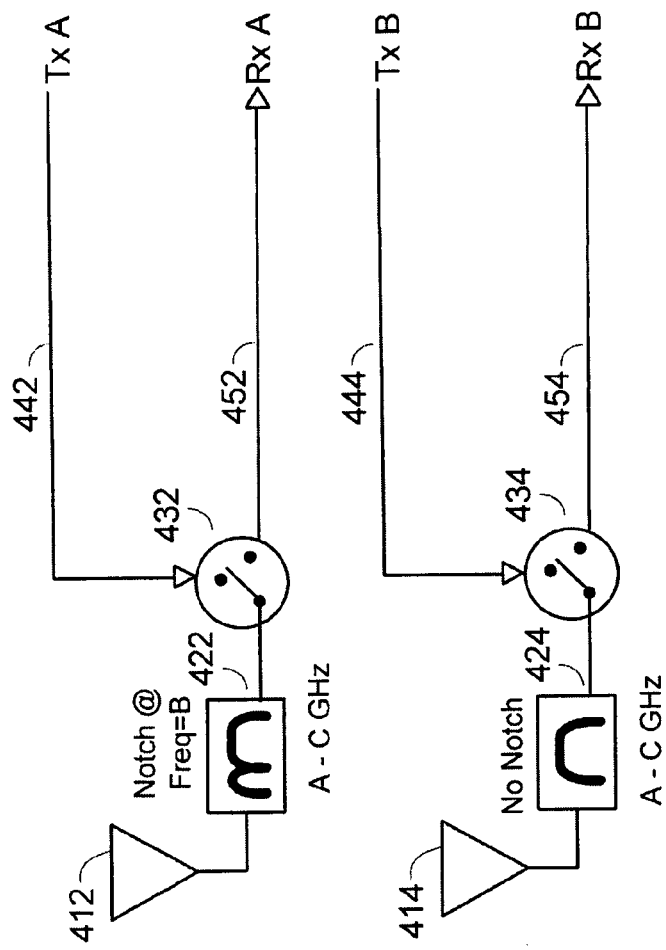
FIG. 4 is a simplified functional block diagram of an embodiment of a transceiver portion with receive path performance diversity.

FIG. 4 is a simplified functional block diagram of an embodiment of a transceiver portion 400 with receive path performance diversity. The simplified functional block diagram illustrates just the RF portion of a transceiver that may be implemented, for example, within a subscriber station of FIG. 1. The transceiver portion 400 can, for example, replace the RF portion of the transceiver of FIG. 3A. The transceiver portion 400 is configured for implementation in a transceiver that is configured to support TDD transmit and receive operation.

The transceiver portion 400 includes a first antenna 412 coupled to a first filter 422. The first filter 422 is configured with a jammer rejection profile that rejects at least one frequency or band or frequencies associated with predetermined jammers. For example, the first filter 432 is depicted as having a notch at a frequency, frequency B, that lies within the operating frequency band. The first filter 422 can also be configured to provide general RF bandpass filtering. The first filter 422 is coupled to a first switch 432 that operates as a T/R switch to selectively switch the first filter 412 to a first transmit path 442 or a first receive path 452.

A second antenna 414 is coupled to a second filter 424 that provides substantially no rejection of jammer frequencies or jammer frequency bands. The second filter 424 provides RF bandpass filtering of the operating band, but does not provide any additional filtering of predetermined jammer frequencies.

The output of the second filter 424 is coupled to a second switch 434 configured as a T/R switch. The second switch 434 selectively switches the second filter 424 to a second transmit path 444 or a second receive path 454.

Providing a signal path having substantially no jammer rejection can be advantageous where the addition of jammer rejection results in increased filter insertion loss. A filter implementing substantially no jammer rejection has minimal insertion loss, and thus, can support a maximum receiver sensitivity. Due to the insertion loss of the filter 422, the first receive path is desensitized compared to the second receive path. The first receive path has a degraded performance when the signal level is very low. The second receive path has a lower overall noise figure and performs better when the signal level is very low. But the second receive path performs poorly in the presence of a large expected jammer because the jammer power captures the second receive path. When captured, the second receive path components may operate in a nonlinear mode, which may introduce in-band and out-of-band spurs as well as signal distortion. In the first path, the jammer power is degraded or substantially attenuated by the first filter 422, and the first receive path continues to perform well in presence of the expected jammer.

The signals in the receive paths 452 and 454 can be processed and combined to improve the receive signal quality. Similarly, the transmit signal can be selectively routed to one or both transmit paths based on one or more transmit operating conditions, that can include transmit power, transmit frequency, and the like.

Figure 5:
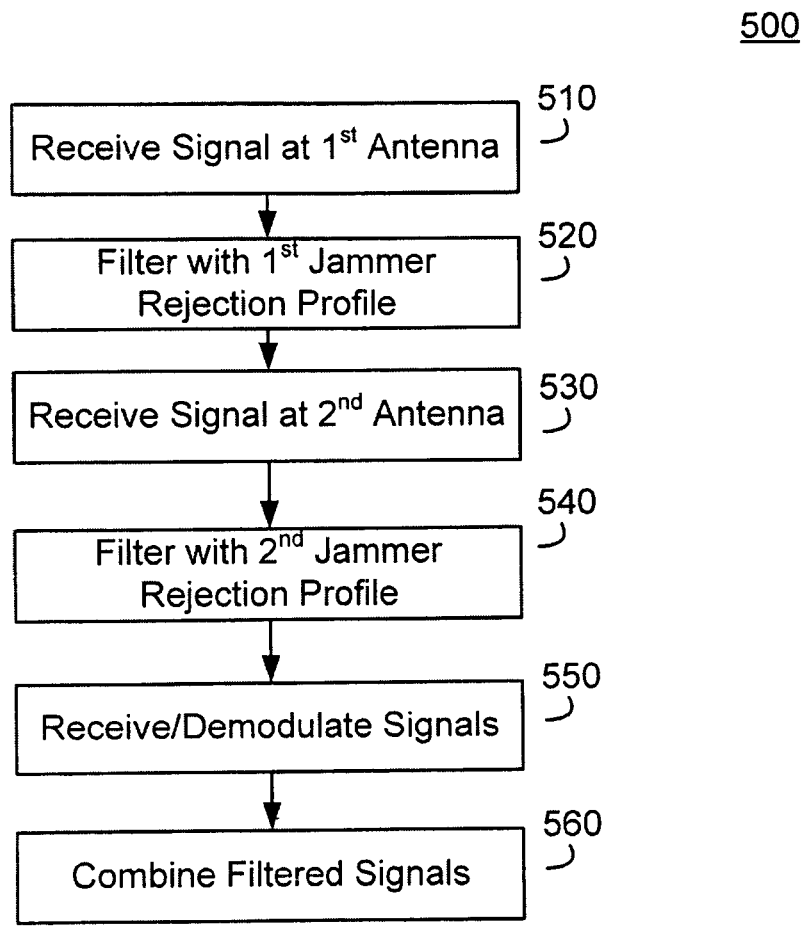
FIG. 5 is a simplified flowchart of an embodiment of a method of receive path performance diversity.

FIG. 5 is a simplified flowchart of an embodiment of a method 500 of receive path performance diversity. The method 500 can be performed, for example, by a receiver in a subscriber station or FIG. 1 or the transceiver of FIG. 2. The method 500 of path performance diversity can be implemented individually or in combination with one or more other receive diversity techniques. Although the method 500 illustrates the operation of multiple receive paths in sequence, a receiver may implement the method 500 to operate multiple receive paths in parallel such that they concurrently process the received signals.

The method 500 begins at block 510 where a receiver receives a signal using a first antenna. The receiver proceeds to block 520 and filters the signal from the first antenna with a receive filter that is configured with a first jammer rejection profile. The first jammer rejection profile is distinct from any other jammer rejection profile included in the receiver. A jammer rejection profile can include substantially no rejection of predetermined jammer frequencies, or substantial rejection of one or more predetermined jammer frequencies. The receive filter can include, for example, a notch or a band reject filter for each predetermined jammer frequency that is filtered out in the first jammer rejection profile.

The receiver proceeds to block 530 and receives a signal using a second antenna. The receiver can receive the signal using the second antenna concurrently or simultaneously with receiving a signal using the first antenna. Alternatively, the signal received using the second antenna may be time offset from the signal at a first antenna.

The receive proceeds to block 540 and filters the received signal using a receive filter that is configured with a second jammer rejection profile, distinct from any other rejection profile used in the receiver. For example, the first receive filter can include a jammer rejection profile that notches a first jammer frequency and the second receive filter can include a distinct jammer rejection profile that notches a second jammer frequency that is distinct from the first jammer frequency.

The receiver proceeds to block 550 and performs further receive processing and/or demodulation of the filtered signals. For example, the receiver can be configured to frequency convert the filtered signals to baseband and digitize the signals prior to combining them. The receiver may also operate to further process the digitized baseband signals. For example, the receiver may demodulate the filtered signals prior to combining them. In an OFDM receiver, the receiver may perform an FFT transformation of received symbols and can perform channel estimation of each received and filtered signal prior to combining.

The receiver proceeds to block 560 and combines the filtered signals (or, more typically, signals derived from the filtered signals) from the first and second receive filters. As described above, the receiver can be configured to perform additional processing of each received and filtered signal prior to combining them. For example, the receiver can amplify and downconvert each filtered signal to a baseband signal and convert the baseband signal to a digital representation prior to a coherent combining operation.

The receiver can implement virtually any type of signal combining, and can, for example, perform a simple sum of the filtered signals, a coherent combination that minimizes some error metric, or a coherent combination that maximizes a metric. For example, the receiver can perform maximum ratio combining, Mean Square Minimum Error combining, best path selection, equal gain combining, switch diversity combining, antenna selection and the like, or some combination thereof.

Figure 6:
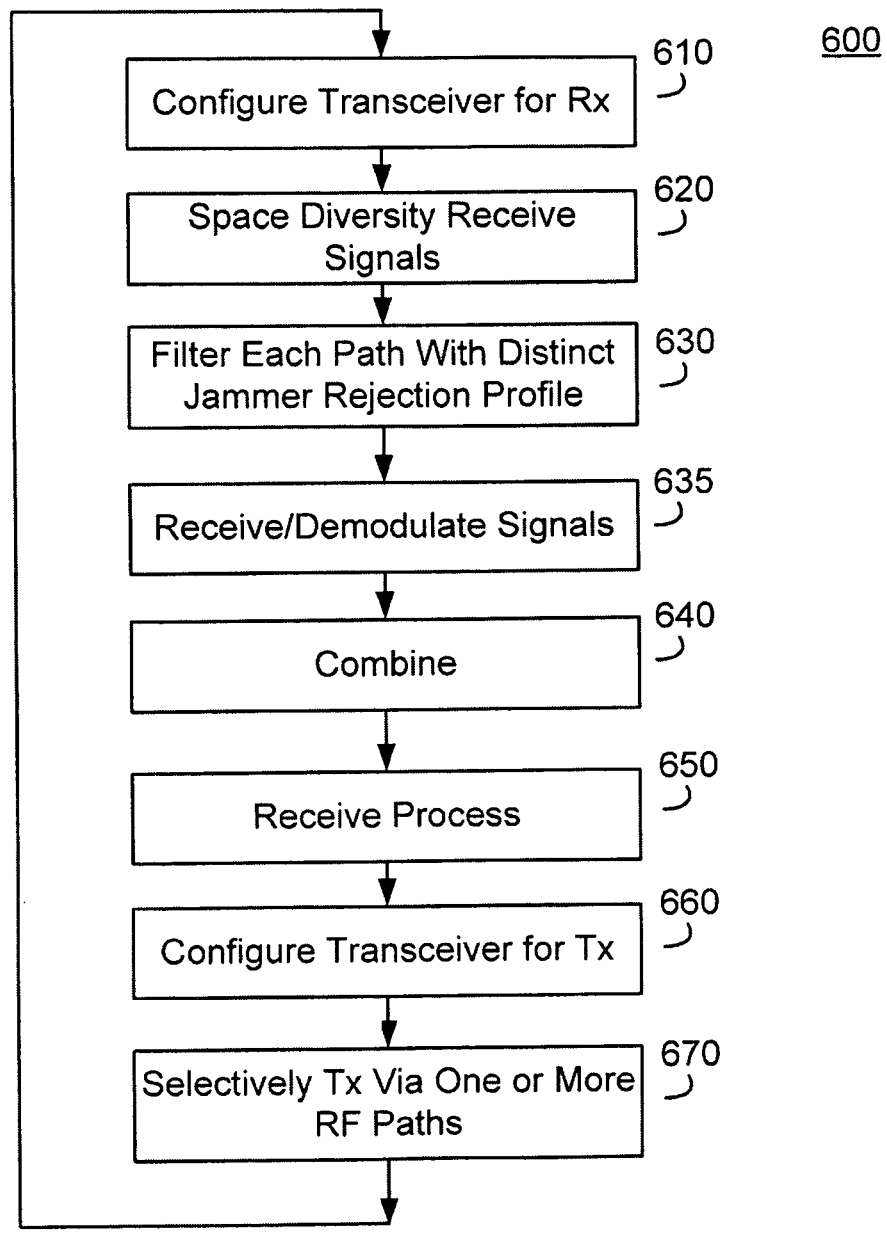
FIG. 6 is a simplified flowchart of an embodiment of a method of receive path performance diversity in a time division duplex transceiver.

FIG. 6 is a simplified flowchart of an embodiment of a method 600 of receive path performance diversity in a time division duplex transceiver. The method 600 can be implemented within a transceiver of a subscriber station of FIG. 1 or by the transceiver of FIG. 2. The method 600 is structured for a transceiver implementing TDD transmit and receive portions. However, the receive path performance diversity is not limited to a TDD implementation.

The method 600 begins at block 610 where the transceiver initially is configured for receive operation. For example, the transceiver may be configured from transmit operation to receive operation prior to the start of a receive period.

The transceiver proceeds to block 620 and space diversity receives a plurality of signals using a plurality of antennas. Each antenna can be spatially distinct relative to any other antenna to promote spatial diversity. Although the method 600 is described in the context of implementing receive path performance diversity with space diversity, receive path performance diversity can be implemented with other diversity receiver types. For example, instead or in conjunction with space diversity, the transceiver may implement frequency diversity, time diversity, code diversity, horizontal/vertical polarization diversity, left hand/right hand circular polarization diversity, and the like, or some combination thereof.

The transceiver proceeds to block 630 and filters each distinct receive path with a filter having a distinct jammer rejection profile. A spatial diversity transceiver includes one antenna for each of the plurality of receive paths. Each distinct path, corresponding to received signals from each antenna, are filtered with a distinct jammer rejection profile.

Each jammer rejection profile can reject any number of predetermined jammer frequencies, from none to a maximum number of predetermined jammer frequencies. However, each jammer rejection profile is distinct. That is, no other jammer rejection profile within the transceiver provides the same frequency response. Multiple jammer rejection profiles can reject the same predetermined jammer frequency provided the remainder of the jammer rejection profiles are distinct. That is, multiple combinations of jammer frequency rejection can include the same jammer frequency, provided the combinations are not identical.

The transceiver proceeds to block 635 and performs additional receive processing and/or demodulation on the filtered receive signals. The type of receive processing or demodulation, if any, performed on the filtered receive signals can depend on the type of signals used in the communication system.

The transceiver proceeds to block 640 and combines the multiple filtered signals in a manner that improves the resultant signal quality. For example, the transceiver can perform maximum ratio combining of baseband versions of the multiple filtered signals. The transceiver proceeds to block 650 and performs any additional receive signal processing on the combined signal.

The transceiver proceeds to block 660 and configures the transceiver for transmitting. After configuring the transceiver for transmitting, the transceiver proceeds to block 670 and selectively transmits the transmit signal using one or more of the filter paths and antennas used for the downlink signal. The transceiver selectively utilizes a filtered signal path based on one or more transmit operating parameters. The operating parameters can include, but are not limited to, transmit frequency, transmit power, and the like. After transmitting the uplink signal, the transceiver returns to block 610 to resume receive processing.

The transceiver embodiments previously described focus primarily on a transceiver that is configured to support a single wireless communication system or a single communication mode. However, receive path performance diversity and selective path transmission are not limited to a single mode transceiver.

Figure 7:
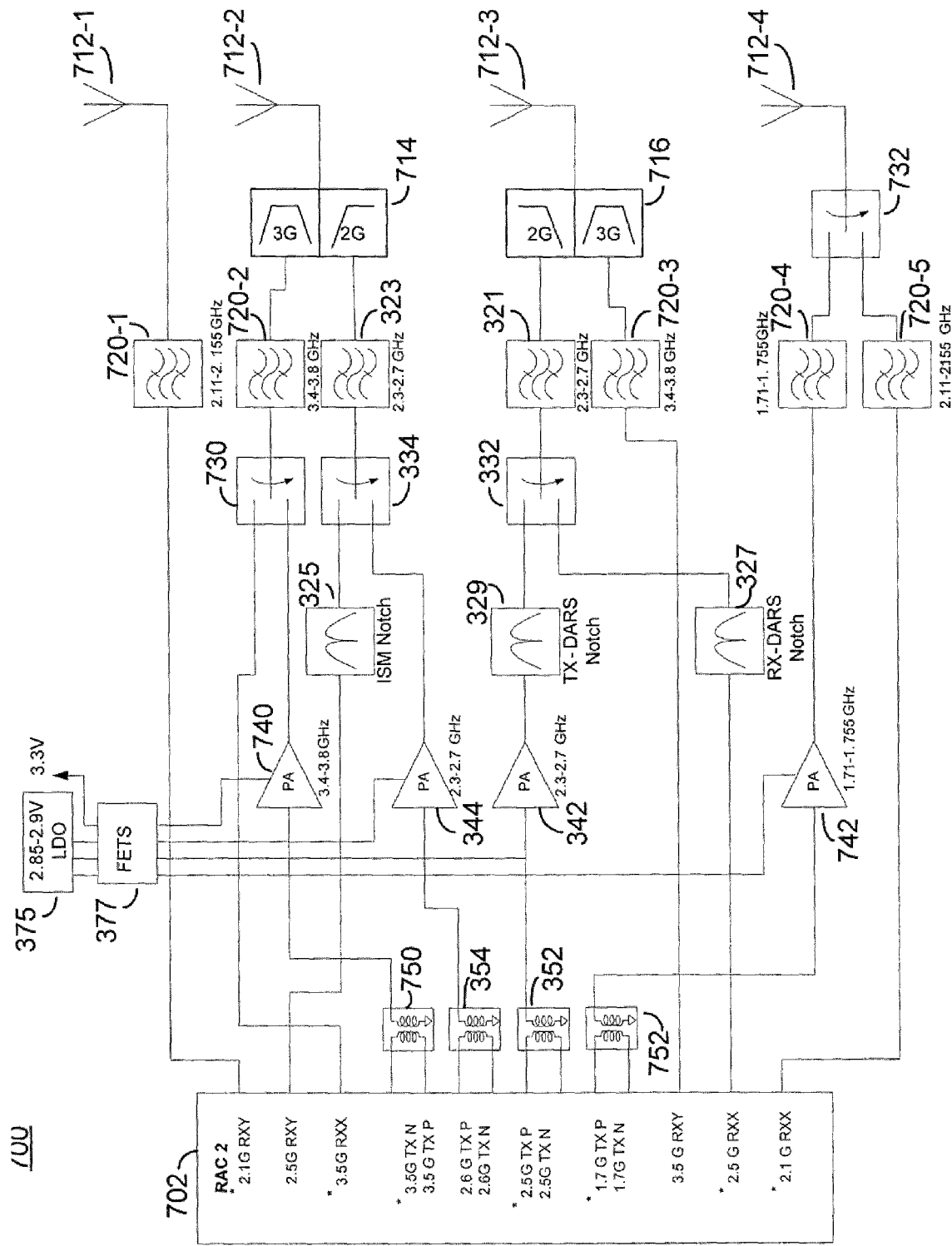
FIG. 7 is a simplified functional block diagram of an embodiment of a multi-band multimode transceiver with receive path performance diversity.

FIG. 7 is a simplified functional block diagram of an embodiment of a multi-band multimode transceiver 700 with receive path performance diversity. The transceiver 700 can be implemented within the system of FIG. 1, and can be configured to support communications across multiple frequency bands corresponding to multiple operating modes. The various operating modes can be exclusive or can overlap. The frequencies noted for reference in FIG. 7 are illustrative and the principles described herein can be directly applied to other frequency bands of interest and other expected jammer bands.

The transceiver 700 of FIG. 7 is configured to support WiMax-type operation across at least portions of the 2.3-2.7 GHz band, communication systems operating in 3.3-3.8 GHz band, as well as FDD Advanced Wireless Spectrum (AWS) systems. Although the transceiver 700 of FIG. 7 explicitly shows receive path performance diversity in only one operating mode, a plurality of operating modes may implement receive path performance diversity.

The transceiver 700 includes four distinct antennas 712-1 through 712-4 to support the multiple communication modes. A first antenna 712-1 supports only receive signals, but generally, the antennas 712-2, 712-3, 712-4, support both transmit and receive signals.

The configuration of the WiMax-type transceiver RF portion of FIG. 7 supporting receive path performance diversity is generally as shown in FIG. 3C. Thus, elements 321, 323, 325, 327, 329, 332, 334, 342, 344, 352, 354, 375 and 377 serve a similar function as like-numbered elements in FIG. 3C. The diplexers 714 and 716 have been added to the architecture to allow for concurrent support of multiple frequency bands by a limited number of antennas. Specifically, the diplexer 714 couples energy below 3 GHz from the antenna 712-2 to the 2.3 to 2.7 GHz filter 323. And, the diplexer 716 couples energy below 3 GHz from the antenna 712-3 to the 2.3 to 2.7 GHz filter 321.

The first antenna 712-1 is coupled to a first AWS receive filter 720-1. The first AWS receive filter 720-1 couples the receive signal to an input of a multimode RF analog circuit 702. The fourth antenna 712-4 is used by both AWS transmit and receive signals. When in receive mode, a switch 732 couples the fourth antenna 712-4 to a second AWS receive filter 720-5. The output of the filter 720-5 is coupled to another receive input of the RF analog circuit 702. In this way, two diversity receive paths are provided to receive AWS spectrum. In an alternate embodiment, the AWS paths could share one or more of antennas 712-2 and 712-3 if diplexers 714 and 716 were designed with a port which passes AWS energy or were replaced with RF switches. Such a design introduces additional insertion loss and desensitizes the AWS receivers but can provide some cost and size benefits due to the elimination of one or more antennas.

The RF analog circuit 702 couples AWS transmit signals via a fourth balun 752 to an AWS PA 742. The output of the AWS PA 742 is coupled to an AWS transmit filter 720-4 that reduces emissions outside of the AWS band. When in transmit mode, the switch 732 couples the output of the filter 720-4 to the fourth antenna 712-4.

A first diplexer 714 couples energy in the 3 GHz band from the second antenna 712-2 to the first 3 GHz bandpass filter 720-2. The first 3 GHz bandpass filter 720-2 is coupled to a 3 GHz T/R switch 730. When in receive mode, the 3 GHz T/R switch 730 couples the signals from the first 3 GHz bandpass filter 720-2 to an input of the RF analog circuit 702.

The RF analog circuit 702 includes a 3 GHz signal output that is coupled via a third balun 750 to the input of a 3 GHz PA 740. The 3 GHz T/R switch 730 couples the signals from the 3 GHz PA 740 to the 3 GHz bandpass filter 720-2 when controlled to support transmit signals.

The second diplexer 716 couples signals in the 3 GHz band from the third antenna 712-3 to a second 3 GHz bandpass filter 720-3. The second 3 GHz bandpass filter 720-3 couples the receive signals to a corresponding input of the RF analog circuit 702. In this way, two diversity receive paths are provided for 3.3 to 3.8 GHz spectrum.

Receive path diversity, such as described above, helps improve the likelihood that at least one receive path will produce a receive signal that is sufficiently free of jammer influences. However, subsequent signal processing, such as the simple combination of the signals from the multiple receive paths, may operate to degrade the signal quality of the recovered symbols. For example, in the case of a Maximum Ratio Combiner, the signals having the greatest signal power are effectively accorded the most weight in the combined signal. However, the receive path exhibiting the greatest signal power may be the receive path having the greatest jammer influence or jammer induced distortion. In some instances, combining the receive path signals without compensating for jammer influences may operate to reduce the signal quality over merely selecting the receive signal path having the best jammer rejection.

In an embodiment, the combined signal can be improved over simple combination by weighting the signals from the different receive paths based on the jammer presence in the receive path. Or, for example, the presence of a jammer on a receive path may be used to decrease the power of that receive path by, for example, decreasing the amplification (e.g., gain) applied in that receive path. By adjusting the weighting or effective contribution of the receive paths based on the influence of a jammer(s) on the receive path, the impact on the combined signal from receive paths having a large jammer distortion can be reduced, while the receive paths not affected by jammer distortion can be effectively more heavily weighted. The weight of a particular receive path may be adjusted by adjusting a weight applied by a combiner or by adjusting a gain in one or more of the receive paths. For example, increasing a weight of a first receive path may be accomplished by increasing the gain in the first receive path or by decreasing the gain in other receive paths.

Figure 8:
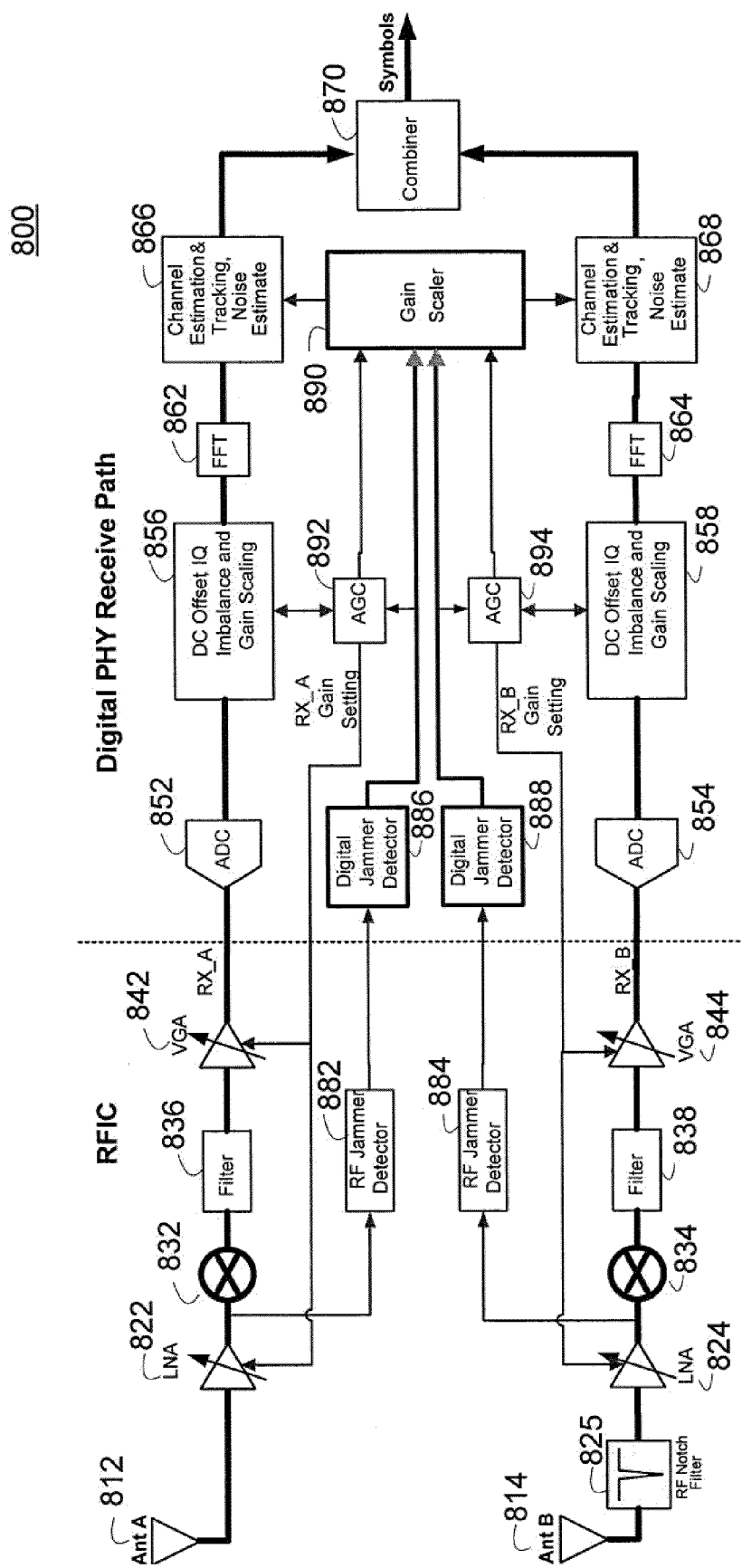
FIG. 8 is a simplified functional block diagram of an embodiment of a receiver having receive path performance diversity and jammer detection.

FIG. 8 is a simplified functional block diagram of an embodiment of a receiver front end 800 having receive path performance diversity and jammer detection. The receiver front end 800 can be, for example, a portion of the subscriber station of FIG. 1. The receiver front end 800 can be configured to interface with a baseband processor to provide processing of receive signals in a wireless communication system operating in an environment potentially populated with one or more signal jammers in identified frequency bands.

The receiver front end 800 is configured similar to the receive path of the transceiver portion illustrated in FIG. 4. The receiver front end 800 can be configured as an analog front end portion interfaced with a digital front end portion. An embodiment of the analog front end is depicted to the left of the dotted separating line in FIG. 8. In one embodiment, the active portions of the analog front end can be implemented within one or more integrated circuits, such as an RF Integrated Circuit (RFIC). Similarly, the digital front end portion is depicted to the right of the dotted separating line in FIG. 8. The digital front end portion can similarly be implemented within one or more integrated circuits, such as a digital physical layer receive path integrated circuit. The division of the various elements is provided as an example, and other embodiments may distribute elements among the RFIC and digital physical layer receive paths differently.

A first receive signal path (path A) is configured without or otherwise substantially devoid of a notch filter providing rejection to an identified jammer band. A second receive signal path (path B) includes an RF notch filter 825 configured to provide rejection of signals in a predetermined jammer frequency band, such as an ISM band. The absence of RF jammer rejection in the first receive signal path maximizes the sensitivity of the first receive path by minimizing the insertion loss in the first receive path. The second receive signal path has lower sensitivity, but also is largely desensitized to the jammer influences, and thus can operate in a linear region in the presence of jammer signals that distort the signals in the first receive signal path.

The receiver front end 800 is also configured to include jammer detection in each of the receive signal paths. The jammer detection outputs are used to weight or otherwise control the gain of the respective receive signal paths prior to signal combining. Controlling the weighting or gain of the distinct receive paths can be advantageous depending on the type of combiner 870 used to combine the processed signals from the receive signal paths. For example, during jammer conditions in an embodiment where the combiner 870 is configured to perform maximum ratio combining (MRC) where no jammer detection is implemented, the combiner may overweight the signal component having the largest jammer contribution to the detriment of the signal component having substantially no jammer contribution. The overweighting of the signal component having the larger jammer contribution operates to degrade the signal quality in the combined signal rather than improving it. Jammer detection can be used to compensate for or otherwise optimize the signal component weighting in order to improve the signal quality output by the combiner 870 under both jammer and jammer free conditions.

The receiver front end 800 includes a first receive signal path having a first antenna 812 coupled to a first LNA 822, which can be configured as a first variable gain LNA. The output of the first LNA 822 is coupled to a first frequency downconverter, shown as a first mixer 832. The first mixer 832 can be configured to frequency convert the signal received in the first receive signal path to baseband or substantially baseband, where baseband refers to a signal in which the received signal is not modulated on to a carrier frequency. The first mixer 832 may utilize a programmable local oscillator (not shown) to perform the frequency conversion from RF to baseband.

The first mixer 832 can be configured to perform quadrature frequency conversion, and signal processing stages following the first mixer 832 may be performed as distinct in-phase (I) and Quadrature (Q) paths. The use of composite or quadrature signal processing is not a limitation on the described methods and receiver implementations.

The receiver front end 800 is illustrated as performing direct downconversion from RF to baseband. In other embodiments, the frequency conversion need not be implemented as a direct conversion and need not be implemented as a frequency conversion to baseband frequencies. For example, the receiver front end 800 may perform frequency conversion to one or more intermediate frequencies prior to frequency conversion to baseband. The one or more intermediate frequencies may be lower than the RF frequency, higher than the RF frequency. In the case of multiple frequency conversions to multiple intermediate frequencies, a first intermediate frequency may be higher than the RF frequency while a second intermediate frequency may be lower than the RF frequency. The benefits of jammer detection are not limited to any particular frequency conversion configuration.

The baseband output from the first mixer 832 is coupled to a first filter 836, which may be implemented as a low pass filter. The output from the first filter 836 is coupled to a first variable gain amplifier 842. The gain of the first variable gain amplifier 842 can be controlled by an Automatic Gain Control (AGC) loop to maintain, for example, the baseband energy within a predetermined range, such as a dynamic range of an Analog to Digital Converter (ADC).

The output of the first variable gain amplifier 842 can be a final analog stage in the receive path. the output of the first variable gain amplifier 842 can be coupled to a first digital receive path. The output of the first variable gain amplifier 842 is coupled to a first ADC 852 that operates to convert the analog baseband signal value to a digital representation. The ADC 852 is depicted as part of the digital physical layer receive path, but may, in other embodiments, be implemented as part of the RFIC.

The output of the first ADC 852 is coupled to a first IQ imbalance and gain correction module 856. The module can be configured to balance the phase and gain imbalance in I and Q signal paths as well as remove any DC offset that may remain or otherwise be introduced during the downconversion or signal processing stages.

The output of the first IQ imbalance and gain correction module 856 couples the balanced and DC offset compensated signal to a first frequency transform module 862, that can be configured as a Fast Fourier Transform (FFT) engine.

The received signal can include, for example, and OFDM symbol and the first frequency transform module 862 can be configured to transform the time domain samples into the counterpart frequency domain subcarriers. The output of the first frequency transform module 862 can be coupled to a first channel estimator 866. The first channel estimator 866 can be configured to estimate the channel and associated noise based on one or more of the signal components. For example, the first channel estimator 866 can be configured to estimate the channel based on one or more pilot channels included in the received signals. The first channel estimator 866 can also be configured to extract the one or more data subcarriers for subsequent combining. The output of the first channel estimator 866 is coupled to an input of the combiner 870.

The second receive path is configured substantially identically to the first receive path, with the exception of the inclusion of the RF notch filter 825 before the second LNA 824. The RF notch filter 825 is configured to reject or otherwise attenuate signals in a predetermined jammer frequency band, such as the ISM band.

A second antenna 814 is coupled to the input of the RF notch filter 825. The output of the RF notch filter 825 is coupled to a second LNA 824. The output of the second LNA 824 is coupled to a second mixer 834 that mixes the RF signal to baseband. The output of the second mixer 834 is coupled to a second filter 838 and from the second filter 838 to the second variable gain amplifier 844.

The output of the second variable gain amplifier 844 is coupled to the second ADC 854. The output of the second ADC 854 is coupled to a second IQ imbalance and gain correction module 858. The gain and phase balanced output from the second IQ imbalance and gain correction module 858 is coupled to a second frequency transform module 864. The output of the second frequency transform module 864 is coupled to the second channel estimator 868. The output from the second channel estimator 868, which can include pilot, data and information channels, is coupled to a second input of the combiner 870. The combiner 870 operates to combine the signals at the inputs and provide the combined output as the recovered symbols for further processing.

Each of the first and second receive paths also includes AGC loop modules for controlling the gain in the respective receive path. A first AGC loop module 892 is coupled to the first IQ imbalance and gain correction module 856 to monitor the amplitude of the signal. Because the first AGC loop control module 892 receives an input from the first IQ imbalance and gain correction module 856, the AGC control is based on signals within a desired signal bandwidth, as determined by filters, such as the filter 836.

The first AGC loop module 892 can include control outputs coupled to the first LNA 822 and the first variable gain amplifier 842 to control the gain provided by those amplifiers. The first AGC loop module 892 also includes one or more control lines coupled to an input of a gain scaler 890. The gain scaler 890 can operate to further adjust the gain applied to the signals prior to combining.

The second AGC loop module 894 is coupled to the second IQ imbalance and gain correction module 858 to monitor the amplitude of the signal. The second AGC loop module 894 can include control outputs coupled to the second LNA 824 and the second variable gain amplifier 844 to control the gain provided by those amplifiers. The second AGC loop module 894 also includes one or more control lines coupled to an input of a gain scaler 890.

Although the two receive paths are substantially similar, the inclusion of the RF notch filter 825 in the second receive path may result in different signals at the respective combiner inputs. The RF notch filter 825 may have a non-zero insertion loss, such as a 1-2 dB insertion loss. Thus, identical RF signals incident on the respective first and second antennas 812 and 814 result in a signal in the second receive path that is attenuated relative to a signal in the first receive path. However, the insertion loss of the RF notch filter 825 will likely not degrade performance of the receiver front end 800 as a whole.

When a jammer signal within the notch band is incident on the two antennas 812 and 814, the RF signals processed by the two receive paths may differ substantially due to the jammer rejection provided by the RF notch filter 825 in the second receive path. The signals processed by the second receive path may be substantially devoid of any significant jammer component, while signals in the first receive path may be substantially affected by the jammer signal.

If the presence of the jammer is not detected by the receiver front end 800, a combiner 870, such as a combiner implementing MRC, may produce a combined output that reflects the effects of receive diversity signal processing. However, by addressing the jammer effects, the output from the combiner 870 can be further improved over any of the individual combiner input signals and over a combiner output where the gains of the receive signal paths do not take into account jammer presence.

Jammer detection and gain control can be used to address the effects of the jammer signal in order to improve the signal quality in the combiner 870 output. The jammer detection and gain control can work in conjunction with AGC loops, but can also operate to intelligently modify the gain in stages of a receive path that normally would not be modified using the AGC alone.

In the receiver front end 800 embodiment of FIG. 8, jammer detection modules are integrated with the AGC modules. A first RF jammer detector 882 is positioned in the first receive path and has an input coupled to the output of the first LNA 822. Thus, the first jammer detector 882 detects signal power over greater than the desired signal bandwidth. The output of the first jammer detector 882 is coupled to a first digital jammer detector 886 that implements a portion of jammer processing in the digital domain. The output of the first digital jammer detector 886 is coupled to an input of the gain scaler 890. The gain scaler 890 supplements the gain scaling of the signals in the receive path with the jammer detection signal, such that the signal can be further weighted based on the jammer effects.

The jammer detection in the second receive path is configured similar to the jammer detection in the first receive path. A second RF jammer detector 884 has its input coupled to the output of the second LNA 824. Because the second receive path includes the RF notch filter 825 positioned prior to the second LNA 824, the second receive path is largely desensitized to jammer influences in the band of the notch. The output of the second RF jammer detector 884 will correspondingly reflect the desensitization to the jammer signals in the notched frequencies.

The output of the second RF jammer detector 884 is coupled to a second digital jammer detector 888 that couples its output to the gain scaler 890 to further control the gain applied to the signals in the second receive path.

In one embodiment, the gain scaler 890 periodically accumulates an indication of jammer presence over a predetermined period of time and weights the gain of the corresponding receive path accordingly. The indication of jammer presence can be determined from the outputs of the digital jammer detectors 886 and 888. In one embodiment, the gain scaler 890 can be configured to apply a gain correction that is inversely proportional to an indication or measure of jammer presence. In this manner, the combiner 870 can achieve an improved signal quality in the combined symbols regardless of the presence or absence of jammer signals.

Figure 9:
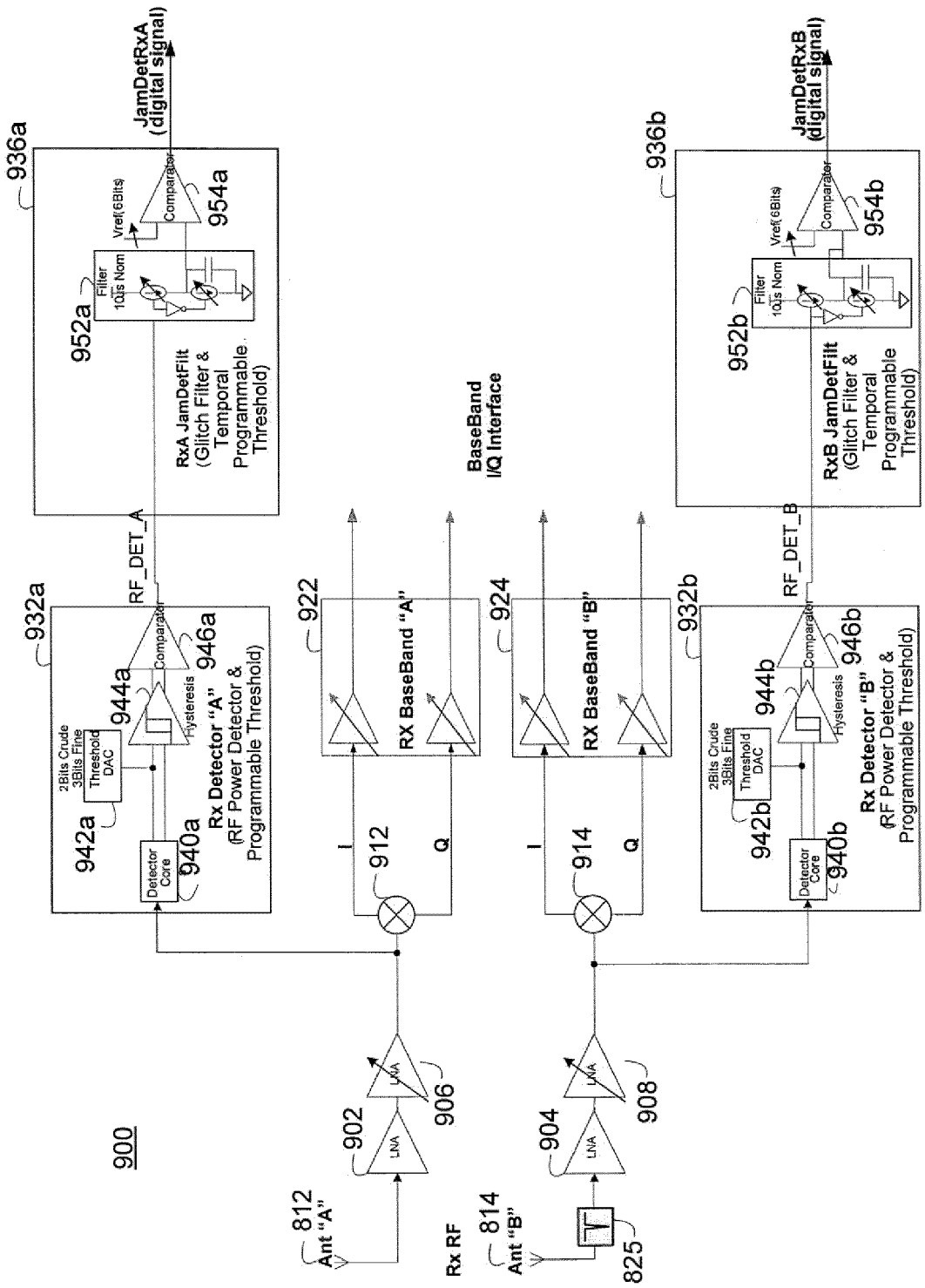
FIG. 9 is a simplified functional block diagram of an embodiment of an analog front end of a receiver having receive path performance diversity and jammer detection.

FIG. 9 is a simplified functional block diagram of an embodiment of an analog front end 900 of a receiver having receive path performance diversity and jammer detection. The analog front end 900 illustrates the jammer detectors in more detail. The analog front end 900 can be, for example, the analog portion of the receiver front end 800 of FIG. 8.

A first receive path includes a first antenna 812 coupled to a first fixed gain LNA 902 in series with a first variable gain LNA 906. The combination of the fixed gain LNA 902 in series with the first variable gain LNA 906 can be, for example, the LNA 822 shown in FIG. 8. The first variable gain LNA 906 can be a continuously variable gain amplifier or can have gain variable in discrete steps. The fixed gain LNA 902 as well as the other elements in the analog front end 900 are depicted with a single ended output for the sake of clarity. It is understood that the various elements may be implemented with single ended outputs or differential outputs. An element may be implemented with differential outputs, for example, to reduce the noise sensitivity of the element.

The differential output from the first variable gain LNA 906 can be coupled to a quadrature downconverter that is depicted as a mixer 912. The mixer 912 can include, for example a I mixer and a Q mixer driven by signals in quadrature from a local oscillator. The local oscillator is not illustrated in the figure. The output from the quadrature downconverter is coupled to a first quadrature baseband amplifier 922 whose output can be the analog output.

The second receive path is similarly configured, except for the inclusion of the RF notch filter 825. The second antenna 814 is coupled to the RF notch filter 825. The output of the RF notch filter 825 is coupled to a second fixed gain LNA 904. The output from the second fixed gain LNA 904 is coupled to a second variable gain LNA 908 that drives a second quadrature downconverter. The second quadrature downconverter includes a mixer 914 that can include an I mixer and a Q mixer. The I and Q mixers of the second quadrature downconverter can be driven by the same local oscillator (not shown) used in the first receive path. The output from the second quadrature downconverter is coupled to a second quadrature baseband amplifier 924 whose output can be the analog output of the second receive path.

The jammer detector in the first receive path includes a first receive detector 932*a* having inputs coupled to the outputs of the first variable gain LNA 906. The first receive detector 932*a* can be, for example, within the RF jammer detector 882 illustrated in FIG. 8. The output of the first receive detector 932*a* is coupled to a first jammer detector filter 936*a*. Similarly, the jammer detector in the second receive path includes a second receive detector 932*b* having inputs coupled to the outputs of the second variable gain LNA 908. The second receive detector 932*b* similarly can be, for example, the RF jammer detector 884 illustrated in FIG. 8. The output of the second receive detector 932*b* is coupled to a second jammer detector filter 936*b*.

Each of the first and second receive detectors 932*a* and 932*b* is typically configured identically. Similarly, each of the first and second jammer detector filters 936*a* and 936*b* is typically configured identically.

Each receive detector includes detector cores 940 coupled to a hysteresis comparator 944. The detector cores 940 can include, for example, an RF detector core and a reference detector core. The hysteresis comparator 944 includes an input driven by a threshold generator 942, that can be, for example, a programmable threshold Digital to Analog Converter (DAC). For example, the threshold value output by the threshold generator 942 may be summed with the output from the reference detector core to establish a jammer presence threshold. The output from the hysteresis comparator 946 is coupled to an output comparator 946.

Each of the jammer detector filters 936*a* and 936*b* includes a filter 952 coupled to a comparator 954. A second input of the comparator 954 is coupled to a threshold value, that can be, for example, a programmable threshold determined from a digital threshold value. The filter 952 in the jammer detector filter 936 can be used to adjust the response time of the jammer detectors.

Figure 10:
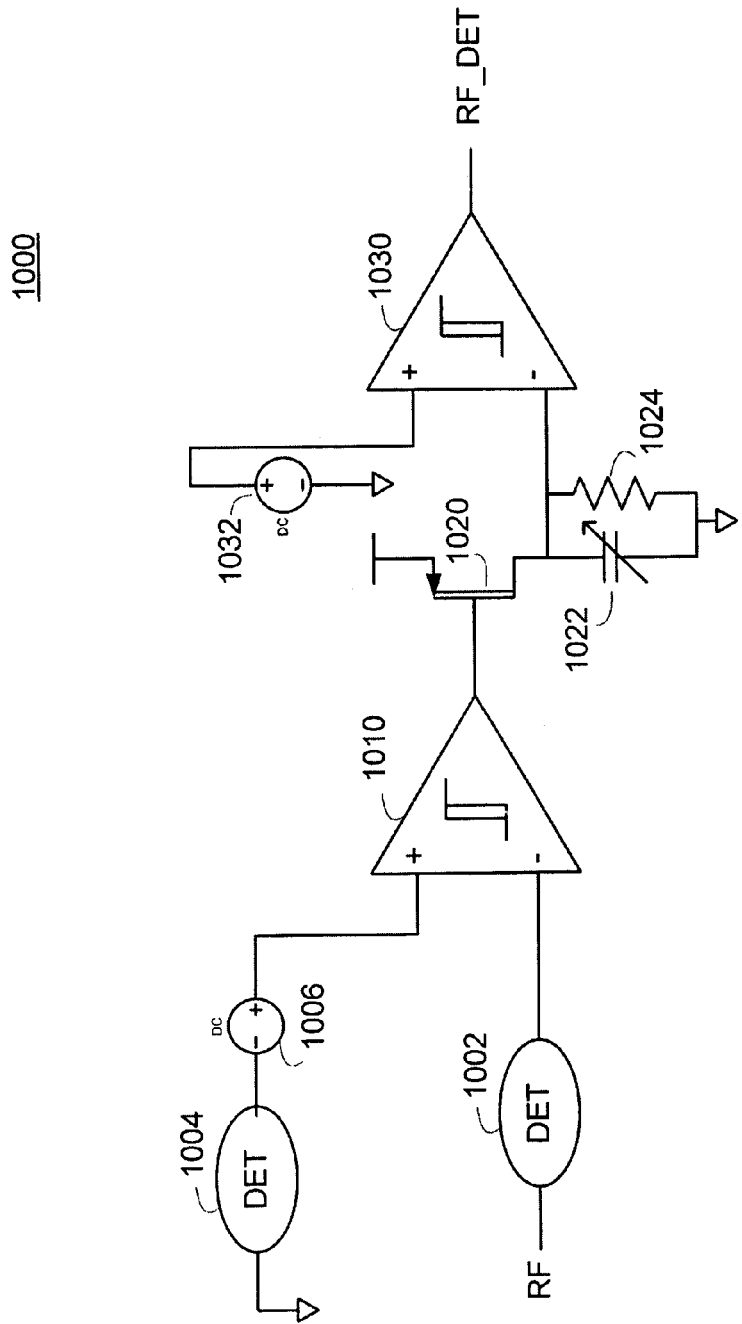
FIG. 10 is a simplified functional block diagram of an embodiment of a jammer detector.

FIG. 10 is a simplified functional block diagram of an alternative embodiment of a jammer receive detector 1000 that can be used as an alternative to the combination of the receive detector 932 and jammer detector filter 936 in the analog front end of FIG. 9. The jammer receive detector 1000 includes a fast response jammer detector coupled to an integrator and threshold comparator.

The fast response jammer detector includes a first detector core 1002 driving a first input of a first hysteresis comparator 1010. A second detector core 1004 coupled to ground or voltage common has an output that is used as a voltage reference for a threshold generator 1006, which may be configured as a programmable voltage device. The term voltage common refers to a common voltage reference point that may be floating or otherwise distinct from a ground connection. The output of the threshold generator 1006 is coupled to a second input to the first hysteresis comparator 1010.

The second detector core 1004 may be eliminated, and the voltage common used as the reference for the threshold generator 1006. However, the second detector core 1004 can be used to eliminate or otherwise compensate for variations attributable to changes in the detector cores 1002 and 1004, such as temperature related fluctuations.

The first hysteresis comparator 1010 in the configuration of FIG. 10 outputs a low voltage when the output from the first detector core 1002 exceeds the threshold established by the threshold generator 1006 and second detector core 1004. The hysteresis aspect of first hysteresis comparator 1010 may help reduce the likelihood of noise triggering a false low-to-high transition or high-to-low transition, and thus help desensitize the comparator to noise on the input.

The output of the first hysteresis comparator 1010 is coupled to an integrator that includes a P-FET 1020 coupled to a capacitor 1022 in parallel with a load resistor 1024. The P-FET selectively charges the capacitor 1022 each time the output of the first hysteresis comparator 1010 is in the low state, signifying jammer detection. The load resistor 1024 provides a DC path to ground to limit the current through the P-FET 1020 as well as to provide a path for discharging the capacitor 1022.

The capacitor 1022 can be a fixed capacitor or a variable capacitor. A variable capacitor can be used to adjust the integration time. Alternatively or additionally, the resistor 1024 can be variable. The values of the capacitor 1022 and resistor 1024 can be selected to provide an integration time constant that operates to filter the jammer detection signals from the first hysteresis comparator 1010.

The charge on the capacitor 1022 is provided to an input of a second hysteresis comparator 1030. A second threshold generator 1032 provides a threshold value to the second hysteresis comparator 1030. The output of the second hysteresis comparator 1030 can be the output of the jammer receive detector 1000.

Figure 11:
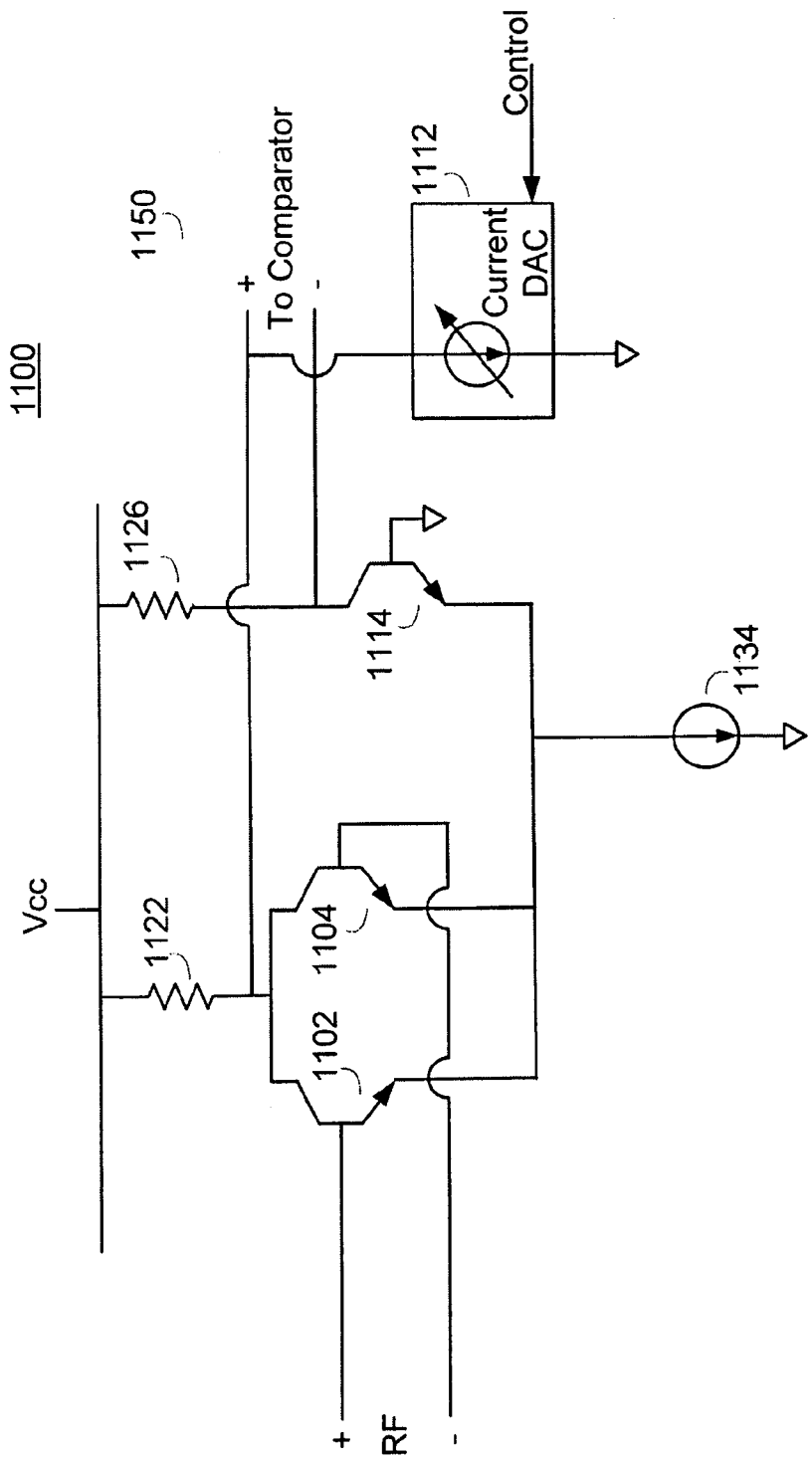
FIG. 11 is a simplified functional block diagram of an embodiment of a jammer detector core.

FIG. 11 is a simplified functional block diagram of a jammer detector core 1100, which can be used as the combination of detector core 940 and threshold DAC 942 illustrated in the detectors 932 in the embodiment of FIG. 10. Additionally, the jammer detector core 1100 embodiment can be used to replace the detector cores 1002 and 1004 and threshold generator 1006 of the embodiment of FIG. 10.

The jammer detector core 1100 includes first differential pair that receives a differential RF signal. A first transistor 1102 has its collector and emitter in common with the collector and emitter, respectively, of a second transistor 1104. A pull-up resistor 1122 couples the common collector connection to a supply voltage. The common connection of the emitters of the first transistor 1102 and the second transistor 1104 is coupled to a constant current source 1134 that is coupled to ground or a voltage common or a voltage return.

The first differential pair receives a differential RF signal. The base of the first transistor 1102 is configured as a positive differential input connection, while the base of the second transistor 1104 is configured as a negative differential input connection. The collector connection of the first and second transistors 1102 and 1104 operate as a positive differential output connection.

The first differential pair operates as a square law device that rectifies the input RF signal. Because the collectors of the first transistor 1102 and the second transistor 1104 are connected to the same pull-up resistor 1122, the output from the differential pair provides the same phase output signal regardless of the phase of the differential input RF signal.

A reference transistor 1114 is configured to provide the negative differential output connection. The reference transistor 1114 has its emitter in common with the emitters of the first and second transistors 1102 and 1104 and is also coupled to the constant current source 1134. The collector of the reference transistor 1114 is coupled to a second pull-up resistor 1126 that couples the collector to the supply voltage. The base of the reference transistor 1114 is coupled to an AC ground, that is the same ground, voltage common, or voltage return that is the reference point for the constant current source 1134. The collector of the reference transistor 1114 is configured as the negative differential output connection.

Although the reference transistor 1114 is depicted as a single transistor, it may be configured as a reference differential pair such that the characteristics of the reference transistor 1114 substantially match the characteristics of the first differential pair. The reference transistor 1114 may be configured as a reference differential pair, for example, by implementing the reference transistor 1114 as a transistor that is twice the size of the first and second transistors 1102 and 1104 used in the first differential pair.

The jammer detector core 1100 produces a detected output signal at the differential output. As the RF signal amplitude increases, a larger percentage of the current from the constant current source flows through the first differential pair. A correspondingly lower percentage of the current from the constant current source 1134 flows through the reference transistor 1114. The redistribution of the current from the constant current source 1134 between the first differential pair and the reference transistor 1114 based on the RF signal level generates a voltage differential at the differential output. The AC component at the outputs of the first differential pair and the reference transistor 1114 represents a common mode voltage that has virtually no effect on the differential output. Thus, the differential output represents a detected voltage representative of the input RF signal level. The differential output can be coupled to a comparator for conversion to a binary or digital signal.

A programmable current DAC 1112 is coupled to the positive connection of the differential output in order to set a threshold or crossing point of the differential output signal. The programmable current DAC 1112 can be coupled to either of the positive or negative differential output connection depending on the desired polarity of the output signal.

Figure 12:
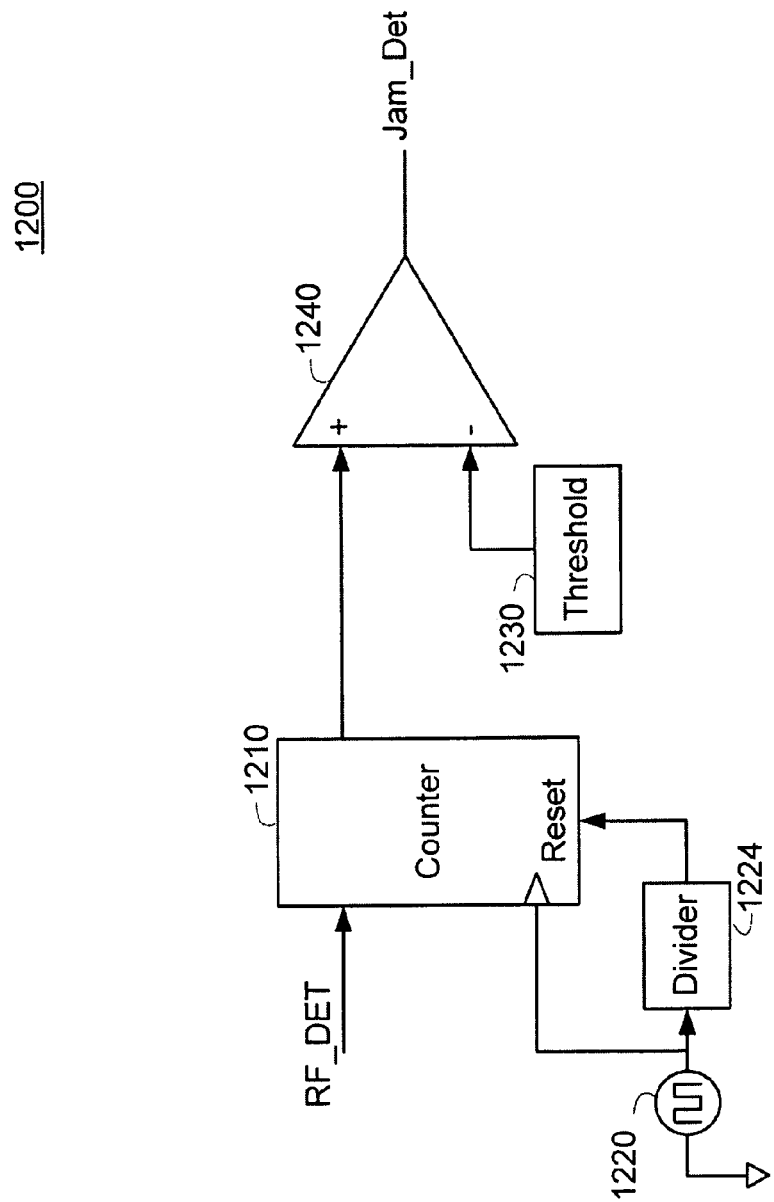
FIG. 12 is a simplified functional block diagram of an embodiment of a digital component of a jammer detector.

FIG. 12 is a simplified functional block diagram of an embodiment of a digital jammer detector 1200, which can be used as the digital jammer detectors 886 and 888 of FIG. 8. The digital jammer detector 1200 operates to count a number of instances of jammer detection in a predetermined period of time by the analog RF jammer detector.

The digital jammer detector includes a counter 1210 configured to receive at its count input, a jammer detection indication, such as from a jammer detector shown in FIG. 10 or FIG. 11. A clock source 1220 operates to clock the counter 1210. A divider 1224 is coupled to the clock source 1220 and operates to reset the counter 1210 after a predetermined number of clock cycles. The output of the counter 1210 represents an indication of the strength of the jammer. For example, a stronger jammer will cause the counter 1210 accumulate a higher count than a weaker jammer.

The digital value output by the counter 1210 is coupled to a logical comparator 1240 that operates to compare the digital value output by the counter 1210 against a predetermined threshold digital value generated by a digital threshold generator 1230. The output of the logical comparator 1240 is an indication of the jammer presence. In other embodiments, the digital counter output can serve as the detector output.

The detection period can be synchronized to a period in the wireless communication system for which the associated receive is configured to operate. For example, where the receiver is configured to operate in a packet communication system, the duration can be synchronized with the packet sizes. In an embodiment in which the receiver is configured to received information arranged in frames, the detection interval can be set to a frame and may be synchronized to a frame boundary.

In one embodiment, the jammer detection signals can be used to control the weighting of the associated receive path signals prior to signal combining by controlling one or more gain values of the stages in the receive paths. In one embodiment, the jammer detection signals can control a jammer compensation offset applied by the AGC module. For example, a jammer detection output indicating the presence of a jammer in a receive path can control the AGC module to decrease the gain in the receive path. The manner in which the gain is reduced can depend, for example, on the distribution of gain in the receive path. For example, the indication of jammer presence may cause the AGC to reduce the gain of the LNA. However, if the AGC has already controlled the gain of the AGC to a minimum value, independent of the jammer presence, the AGC may reduce the gain of some other stage, such as the variable gain amplifier or the IQ balance module.

The ability of the AGC to control the receive path gain based on jammer presence can vary based on a coarseness of the jammer presence indication. For example, where the jammer detection modules only have the ability to indicate presence or absence of a jammer signal, the AGC may have limited ability to optimally compensate or weight the receive signal path gain for the jammer signals. Alternatively, where the jammer detection modules have the ability to provide a jammer metric value that can be multiple values, the AGC module may be able to compensate for the indication of jammer presence based on the strength of the jammer signal, as determined by the jammer metric value.

Figure 13:
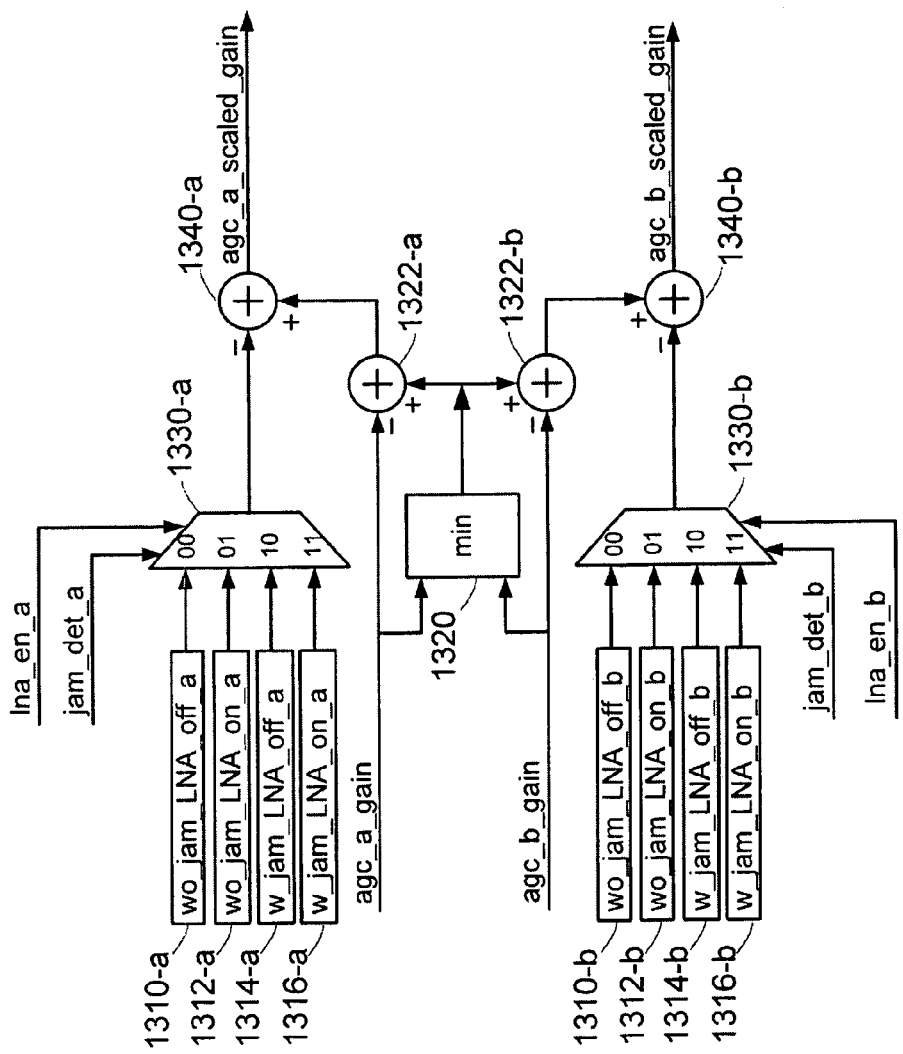
FIG. 13 is a simplified functional block diagram of an embodiment of a gain scaler.

FIG. 13 is a simplified functional block diagram of an embodiment of a gain scaler 890. The gain scaler 890 can be the gain scaler illustrated in FIG. 8, and can, for example, operate in conjunction with the receiver front end of FIG. 9 and one or more jammer detectors illustrated in FIGS. 10-12. The gain scaler 890 is illustrated in the context of a diversity receiver having two distinct diversity paths. However, the gain scaler 890 is not limited to just two diversity paths, and may be expanded to support additional diversity paths.

The gain scaler 890 includes a first multiplexer 1330-*a* having two control inputs. The values of the two control inputs control the selection of four possible inputs. The first multiplexer 1330-*a* is configured to receive a first LNA enable signal and a first jammer detector signal as control inputs. The LNA enable signal may indicate, for example, whether the LNA in a first diversity receive path is enabled by the respective first AGC. The first jammer detector signal may indicate the presence of a jammer in the first diversity receive path, and may be generated, for example, by a jammer detector as illustrated herein.

Four distinct offset generators 1310-*a*, 1312-*a*, 1314-*a*, and 1316-*a*, are coupled, respectively, to the four inputs of the first multiplexer 1330-*a*. Each of the four offset generators, 1310-*a*, 1312-*a*, 1314-*a*, and 1316-*a*, is configured to generate an offset or weighting value corresponding to one of the possible control input states. The selected output, based on the control input values or states, is coupled to the output of the first multiplexer 1330-*a*. The output of the first multiplexer 1330-*a* is coupled to an input of a first weighting combiner 1340-*a*. The output of the first weighting combiner 1340-*a* is the scaled or weighted AGC value for the first diversity receiver.

A first offset generator 1310-*a* can be configured to generate a first offset or gain weighting value that is associated with a first control input state. The first control input state can correspond, for example, to no jammer presence and LNA not enabled.

A second offset generator 1312-*a* can be configured to generate a second offset or gain weighting value that is associated with a second control input state. The second control input state can correspond, for example, to no jammer presence and LNA enabled. A third offset generator 1314-*a* can be configured to generate a third offset or gain weighting value that is associated with a third control input state. The third control input state can correspond, for example, to jammer presence and LNA not enabled. A fourth offset generator 1316-*a* can be configured to generate a fourth offset or gain weighting value that is associated with a fourth control input state. The fourth control input state can correspond, for example, to jammer presence and LNA enabled.

Each offset generator, 1310-*a*, 1312-*a*, 1314-*a*, or 1316-*a*, can be configured, for example, to generate a gain weighting value or offset value that can be used to adjust a receive signal path gain applied via an AGC loop. Each offset generator, 1310-*a*, 1312-*a*, 1314-*a*, or 1316-*a*, can be, for example a register, a voltage source, a current source, and the like, or some combination thereof, that maps to a gain offset or weighting value. The offset generators 1310-*a*, 1312-*a*, 1314-*a*, and 1316-*a*, can be configured with static offset values or can be dynamically configurable.

A second multiplexer 1330-*b* operates in conjunction with a second diversity receive path and is configured substantially identically to the first multiplexer 1330-*a*. The second multiplexer 1330-*b* is configured to receive a second LNA enable signal and a second jammer detector signal as control inputs.

The second multiplexer 1330-*b* receives as signal inputs, values from each of four offset generators, 1310-*b*, 1312-*b*, 1314-*b*, and 1316-*b*. The four offset generators 1310-*b*, 1312-*b*, 1314-*b*, and 1316-*b* can be configured, for example, substantially identically to the offset generators used to weight the first diversity receive path.

The output of the second multiplexer 1330-*b* is coupled to an input of a second weighting combiner 1340-*b*. The output of the second weighting combiner 1340-*b* is the scaled or weighted AGC value for the second diversity receiver.

A first AGC gain value, such as from a first AGC control loop, is coupled to an input of a first combiner 1322-*a* and a first input of a signal selector 1320. A second AGC signal value is coupled to an input of a second combiner 1322-*b* as well as a second input of the signal selector 1320. The output of the signal selector 1320 is coupled to second inputs of both the first and second combiners 1322-*a* and 1322-*b*. The signal selector 1320 operates to select the minimum of the first AGC gain or the second AGC gain.

The first combiner 1322-*a* subtracts the first AGC gain value from the minimum of the first or second AGC gain values to generate a modified first AGC gain value. The output of the first combiner 1322-*a* is coupled to a second input of the first weighting combiner 1340-*a*, where the modified first AGC gain value is weighted by the appropriate weighting factor, as determined by the control inputs at the first multiplexer 1330-*a*.

The second combiner 1322-*b* subtracts the second AGC gain value from the minimum of the first or second AGC gain values to generate a modified second AGC gain value. The output of the second combiner 1322-*b* is coupled to a second input of the second weighting combiner 1340-*b*, where the modified second AGC gain value is weighted by the appropriate weighting factor, as determined by the control inputs at the second multiplexer 1330-*b*.

Figure 14:
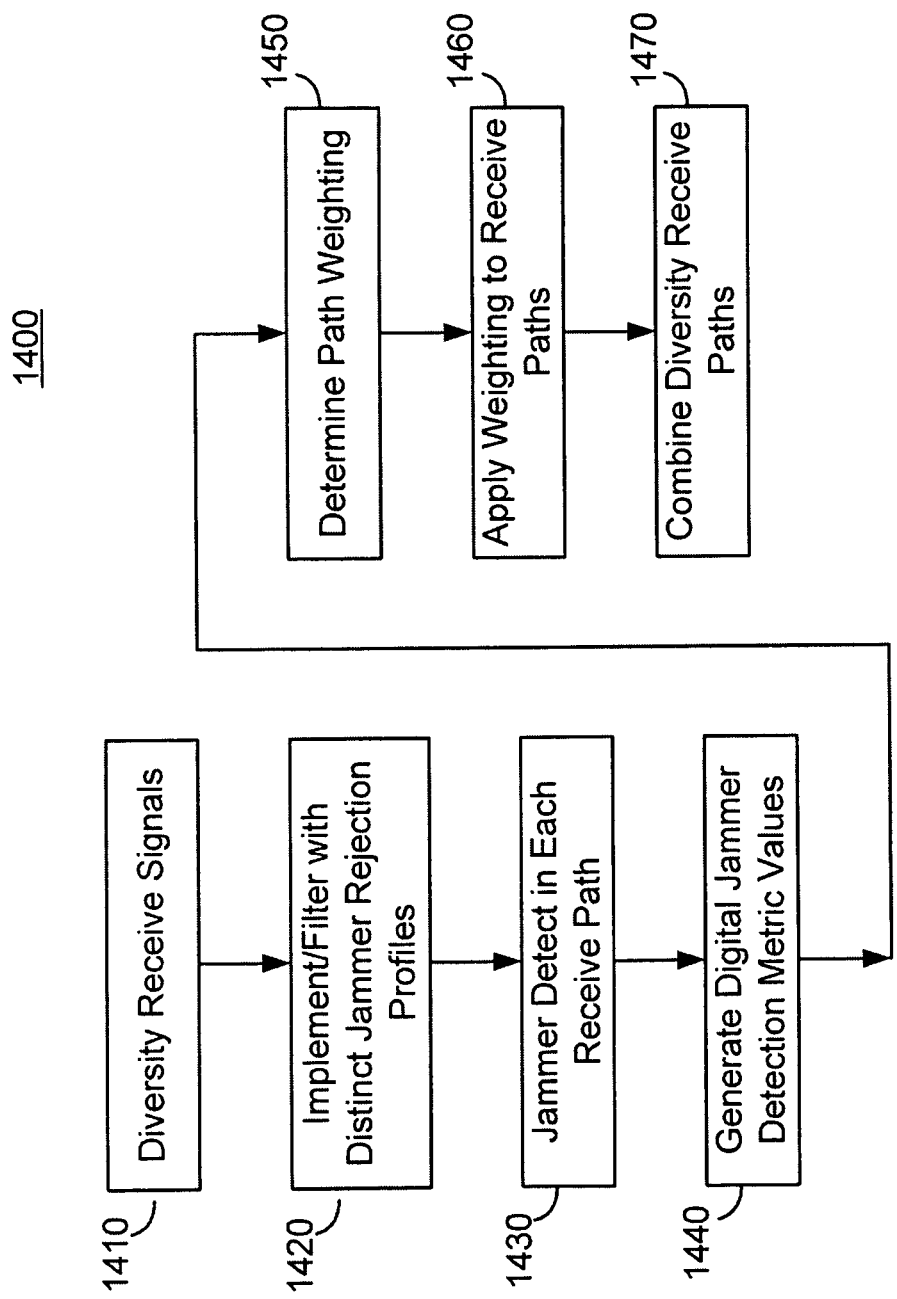
FIG. 14 is a simplified functional block diagram of an embodiment of a method of receive path performance diversity with jammer detection.

FIG. 14 is a simplified functional block diagram of an embodiment of a method 1400 of receive path performance diversity with jammer detection. The method 1400 can be performed, for example, by the receiver of FIG. 8 or a receiver configured with the receive front end of FIG. 9.

The method 1400 begins at block 1410 where the receiver receives signals at multiple receive paths. In the example of FIG. 14, the receiver is configured as a diversity receiver and can be configured to receive RF signals at each of a plurality of diversity antennas. Each of the diversity antennas can be coupled to a counterpart receive path.

The receiver proceeds to block 1420 and processes or otherwise filters each of the distinct receive paths with a distinct jammer rejection profile. In the embodiment of FIGS. 8 and 9, a first receive path includes substantially no jammer notch and is substantially devoid of jammer filtering, while a second receive path includes an RF notch filter configured to reject or otherwise attenuate signals in a predetermined jammer frequency band.

The receiver proceeds to block 1430 and performs jammer detection in each of the receive paths. Jammer detection typically occurs at RF frequencies and after an amplifier stage and after any jammer filtering. By detecting the jammer after the jammer filter, the receiver is able to determine a truer measure of the jammer influence on the receive path. However, this order of processing is for example, and other configurations are possible. For example, in another embodiment, jammer detection may occur prior to jammer filtering.

The jammer detection occurs over a bandwidth that includes out of band jammers. In contrast, a detector used for the AGC loop likely only makes the AGC decision based on signals within the desired operating band of the receiver. As such, an AGC typically does not operate outside the operating band of the receiver and thus does not detect jammers located outside the operating band, such as, in neighboring RF bands. Thus, the RF jammer detectors will likely indicate a different value compared to an AGC detector at the same receive stage.

The jammer detector can be configured to provide a coarse jammer indication, or may be configured to determine a jammer metric value that may have multiple values or that may be continuous over a predetermined range. As described earlier, the distinct jammer rejection profiles implemented by the various receive paths will likely cause different jammer detection results in the presence of jammers.

The receiver proceeds to block 1440 and determines or otherwise generates digital jammer metric values. The digital jammer metric values can be determined by counting jammer detection instances over a predetermined period of time. For example, the digital jammer metric value can be determined based on counting the number of jammer detection instances occurring over a frame of data, where a frame represents a predetermined period of time. The digital jammer metric value can represent a variable jammer metric value. In an alternative embodiment, the digital jammer metric value can be compared against a count threshold to provide an indication of the presence or absence of a jammer signal in the associated receive path.

The receiver proceeds to block 1450 to determine the path weighting. The digital jammer signal, whether a variable metric value or a presence/absence indicator, can be used to determine the weighting or gain compensation applied to signals in the receive path corresponding to the jammer detector. In one embodiment, the digital jammer value contributes to offset a detector value in an AGC loop, such that a larger jammer presence causes the AGC to decrease the gain in the receive path. The amount of gain reduction can be determined by an amount of offset summed into the AGC loop.

The receiver proceeds to block 1460 and applies the gain compensation or weighting that is a result of the jammer detection. In the embodiment described above, where the jammer detection contributes to an offset in the AGC loop, the AGC loop controls the gain in the same manner as if the AGC loop detected a power increase. Similarly, the combiner may adjust a weight to one or more signals being combined, such as, for example, decreasing a weight applied to a signal for which jammer presence is detected.

The receiver independently detects the jammer in each receive path and independently controls the gain supplied in the receive path based on the respective jammer detection signals. The receiver proceeds to block 1470 and combines the jammer compensated signals from the multiple receive paths. The combiner can be, for example, a Maximum Ratio Combiner that operates to combine the baseband symbols from each receive path. The use of jammer compensation permits an increase in the signal quality at the output of an MRC.

Methods and apparatus for receive path performance diversity have been described herein. The methods and apparatus permit a receiver to operate under a wide range of operating environments including environments having one or more predetermined jammers. The receiver can be configured to maintain sensitivity and yet operate under harsh out of band jammer conditions.

The inclusion of jammer detection in each of the receive paths permits jammer presence based gain compensation. The receiver compensates for the presence of jammers to enable an increased signal quality at the combiner output. The receiver weights the signals in the various receive paths to compensate for jammer induced distortion.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of receiving signals in a wireless communication device having receive path diversity, the method comprising: receiving a first signal and one or more second signals each via a distinct receive path, wherein each of the distinct receive paths operate on a same receive band; determining whether a jammer signal is present in the first received signal; weighting the first received signal based on the determined presence of the jammer signal in the first signal to generate a weighted first received signal; uniquely filtering the one or more received second signals to attenuate each of the one or more received second signals at a respective unique frequency in the same receive band, the filtering generating a respective uniquely filtered signal for each of the one or more received second signals; determining, following the uniquely filtering, whether the jammer signal is present in each of the generated one or more uniquely filtered signals; weighting each of the generated one or more uniquely filtered signals based on the respective determined presence of the jammer signal in each of the generated one or more uniquely filtered signals to generate a respective weighted signal for each of the one or more uniquely filtered signals.

2. The method of claim 1, wherein the receiving the first signal and one or more second signals each via a distinct receive path comprises receiving radio frequency (RF) signals at a plurality of diversity antennas, each of the plurality of diversity antennas coupled to a corresponding one of the distinct receive paths.

3. The method of claim 1, wherein the filtering the one or more received second signals comprises filtering a radio frequency (RF) signal in a first receive path with an RF notch filter configured to attenuate signals in a predetermined jammer frequency band.

4. The method of claim 3, wherein the predetermined jammer frequency band comprises substantially an Industrial, Scientific, and Medical (ISM) band.

5. The method of claim 3, wherein the filtering the one or more received second signals further comprises filtering RF signals including jammer signals in a second receive path.

6. The method of claim 1, wherein determining whether the jammer signal is present comprises:
   detecting a radio frequency (RF) signal level in a receive path;
   comparing the detected RF signal level to a predetermined threshold to provide a jammer indication; and
   integrating the jammer indication with a predetermined integration time constant.

7. The method of claim 6, determining whether the jammer signal is present further comprises generating a digital jammer indication based on the integrated jammer indication.

8. The method of claim 7, wherein the generating the digital jammer indication comprises:
   comparing the integrated jammer indication to a predetermined integration threshold; and
   counting a number of instances in a predetermined time period that the integrated jammer indication exceeds the predetermined integration threshold.

9. The method of claim 8, further comprising:
   comparing a count value to a predetermined count threshold; and
   outputting a jammer presence indication if the count value exceeds the predetermined count threshold.

10. The method of claim 1, further comprising reducing an amplifier gain in a distinct receive path in the presence of the jammer in the distinct receive path.

11. The method of claim 1, further comprising increasing an amplifier gain in a receive path in the absence of the jammer in the receive path.

12. The method of claim 1, further comprising offsetting an Automatic Gain Control (AGC) loop control signal in each of the distinct receive paths based on an indication of the presence of the jammer signal in the distinct receive path.

13. The method of claim 1, further comprising combining the weighted first received signal and the weighted one or more uniquely filtered signals.

14. The method of claim 1, wherein the filtering the one or more received second signals substantially attenuates at least one predetermined jammer associated with a respective unique jammer rejection profile.

15. A method of receiving signals in a wireless communication device having receive path diversity, the method comprising:
   receiving a first radio frequency (RF) signal via a first signal path, wherein the first signal path operates on a first receive band;
   filtering the first RF signal to attenuate a jammer located within the first receive band, the filtering generating a first filtered RF signal;
   determining, following the filtering, whether the jammer is present in the first filtered RF signal;
   applying a first weight to the first filtered RF signal based on the determined jammer presence in the first filtered RF signal;
   receiving a second RF signal via a second receive path, wherein the second signal path operates on the first receive band;
   determining whether the jammer is present in the second received RF signal;
   and applying a second weight to the second received RF signal based on the determined jammer presence in the second received RF signal.

16. The method of claim 15, wherein filtering the first RF signal comprises filtering the first RF signal with a RF notch filter configured to attenuate signals in a predetermined jammer frequency band.

17. The method of claim 15, further comprising:
   detecting a level of the first filtered RF signal;
   comparing the detected level to a first detection threshold to provide a first jammer indication;
   counting a number of instances over a predetermined period in which the first jammer indication indicates jammer presence;
   comparing the number of instances to a predetermined threshold count to determine a digital jammer presence indication.

18. The method of claim 17, wherein the predetermined period comprises a frame duration determined based on a timing of the received first and second RF signals.

19. The method of claim 15, further comprising:
   generating an analog jammer detection indication; and
   generating a digital jammer presence indication based the analog jammer detection indication.

20. The method of claim 15, wherein the applying the first weight to the first filtered RF signal comprises adjusting a gain distribution in the first receive path based on the determined jammer presence in the first filtered RF signal.

21. The method of claim 15, further comprising combining the weighted first filtered RF signal with the weighted second received RF signal.

22. An apparatus having receive path performance diversity, the apparatus comprising:
- a first receive path of a diversity receiver having a first filter tuned to a first band, wherein the first filter is configured to:
  - attenuate noise located at a first frequency within the first band; and
  - generate a first filtered signal;
- a second receive path of the diversity receiver having a second filter tuned to the first band, wherein the second filter is configured to:
  - attenuate noise located at a second frequency within the first band, wherein the second frequency is different than the first frequency; and
  - generate a second filtered signal;
- a first jammer detector configured to determine a jammer presence in the first filtered signal and responsively output a first detection signal;
- a second jammer detector configured to determine the jammer presence in the second filtered signal and responsively output a second detection signal;
- a gain scaler configured to adjust a gain applied to the first filtered signal and the second filtered signal based on the respective first detection signal and second detection signal.

23. The apparatus of claim 22, wherein the first receive path is coupled to a first antenna spatially diverse from a second antenna coupled to the second receive path.

24. The apparatus of claim 22, wherein the first receive path is coupled to a first antenna that is at least one of polarization, direction, or thermal diverse from a second antenna coupled to the second receive path.

25. The apparatus of claim 22, wherein the first filter comprises a RF notch filter configured to attenuate signals within at least a portion of a predetermined jammer frequency band.

26. The apparatus of claim 22, wherein the first jammer detector comprises:
- an RF detector coupled to an RF section of the first receive path; and
- a digital jammer detector coupled to the RF detector and configured to generate a digital jammer presence indication based on an output from the RF detector.

27. The apparatus of claim 22, wherein the first jammer detector comprises:
- a differential amplifier having a differential input configured to receive the first filtered signal and having a first output;
- a reference amplifier configured to provide a reference output; and
- a comparator configured to compare a level at the first output to a predetermined threshold determined based on the reference output and provide a comparator output based on the comparison.

28. The apparatus of claim 27, wherein the first jammer detector further comprises:
- a counter configured to count a number of instances over a predetermined period in which the comparator indicates a jammer;
- a digital comparator configured to compare the number of instances to a predetermined threshold count to determine a digital jammer presence indication.

29. The apparatus of claim 22, wherein the gain scaler comprises an automatic gain control loop gain controller, and wherein the gain scaler offsets an AGC detection value for each of the first and second receive paths based on the respective detection signal.

30. The apparatus of claim 22, further comprising a combiner configured to combine the gain scaled first filtered signal and the gain scaled second filtered signal.

* * * * *